United States Patent
Ono et al.

(10) Patent No.: US 9,933,907 B2
(45) Date of Patent: Apr. 3, 2018

(54) TOUCH SCREEN, TOUCH PANEL, DISPLAY, AND ELECTRONIC APPARATUS

(71) Applicant: Mitsubishi Electric Corporation, Tokyo (JP)

(72) Inventors: Takeshi Ono, Tokyo (JP); Tatsuya Nakamura, Tokyo (JP); Takashi Miyayama, Tokyo (JP); Tae Orita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 160 days.

(21) Appl. No.: 15/141,937

(22) Filed: Apr. 29, 2016

(65) Prior Publication Data

US 2016/0357285 A1  Dec. 8, 2016

(30) Foreign Application Priority Data

Jun. 4, 2015  (JP) .................................. 2015-113602

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04107* (2013.01); *G06F 2203/04112* (2013.01)

(58) Field of Classification Search
USPC .................. 345/156, 173, 174, 690; 257/292
See application file for complete search history.

(56) References Cited

U.S. PATENT DOCUMENTS

| 5,844,506 A | 12/1998 | Binstead |
| 6,137,427 A | 10/2000 | Binstead |
| 6,452,514 B1 | 9/2002 | Philipp |
| RE40,867 E | 8/2009 | Binstead |
| 9,295,176 B2 | 3/2016 | Ohtani et al. |
| 9,508,770 B2* | 11/2016 | Yanagita ........... H01L 27/14634 345/174 |
| 2013/0021285 A1* | 1/2013 | Kimura ............... G02F 1/13338 345/173 |
| 2015/0070305 A1* | 3/2015 | Seo ....................... G06F 3/0412 345/174 |
| 2015/0097810 A1* | 4/2015 | Aoki ....................... G06F 3/044 345/174 |

(Continued)

FOREIGN PATENT DOCUMENTS

| JP | 9-511086 A | 11/1997 |
| JP | 2003-526831 A | 9/2003 |

(Continued)

*Primary Examiner* — Thuy Pardo
(74) *Attorney, Agent, or Firm* — Studebaker & Brackett PC

(57) ABSTRACT

A plurality of first lattice passing line segments are defined. The first lattice passing line segments extend in a first direction through lattice points adjacent to each other among a plurality of lattice points at which a plurality of first component portions and a plurality of second component portions of a black matrix are connected to each other. Ones of two or more first partial wires and two or more first lattice passing line segments are arranged in straight lines extending in the first direction, and the other ones are arranged along the first direction and located at unequal distances from the ones.

13 Claims, 33 Drawing Sheets

(56) References Cited

U.S. PATENT DOCUMENTS

| | | | |
|---|---|---|---|
| 2015/0179691 A1* | 6/2015 | Yanagita | H01L 27/14634 257/292 |
| 2015/0212622 A1* | 7/2015 | Hirata | G06F 3/044 345/174 |
| 2016/0109994 A1* | 4/2016 | Liu | G06F 3/0412 345/174 |
| 2016/0132159 A1* | 5/2016 | Aoki | G06F 3/044 345/174 |
| 2016/0202805 A1* | 7/2016 | Ichiki | G06F 3/044 345/174 |
| 2017/0062499 A1* | 3/2017 | Yanagita | H01L 27/14634 257/292 |

FOREIGN PATENT DOCUMENTS

| | | |
|---|---|---|
| JP | 2009-259063 A | 11/2009 |
| JP | 2012-103761 A | 5/2012 |
| WO | 95/27334 A1 | 10/1995 |
| WO | 00/044018 A1 | 7/2000 |

\* cited by examiner

F I G. 1 2
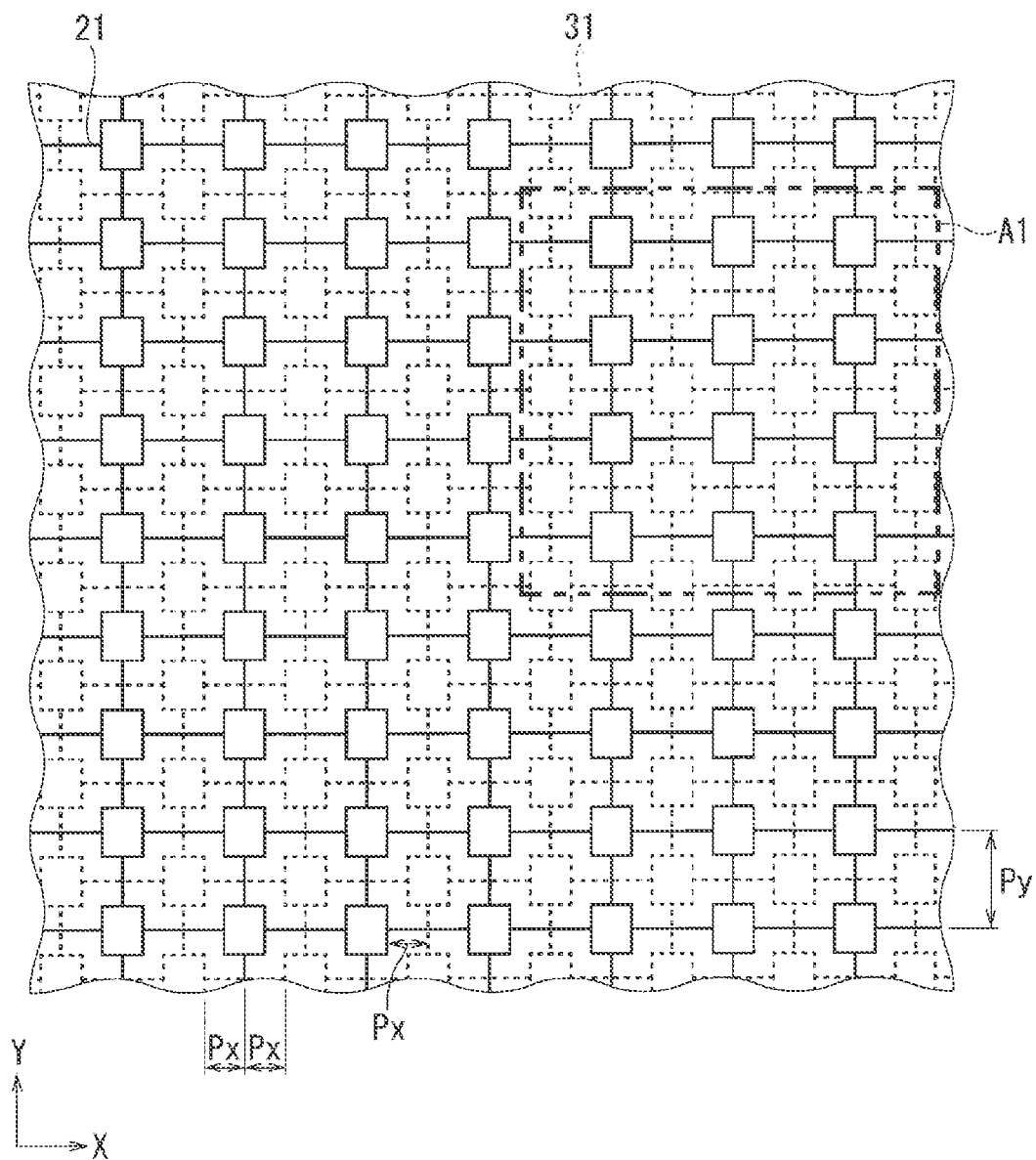

F I G. 2 4
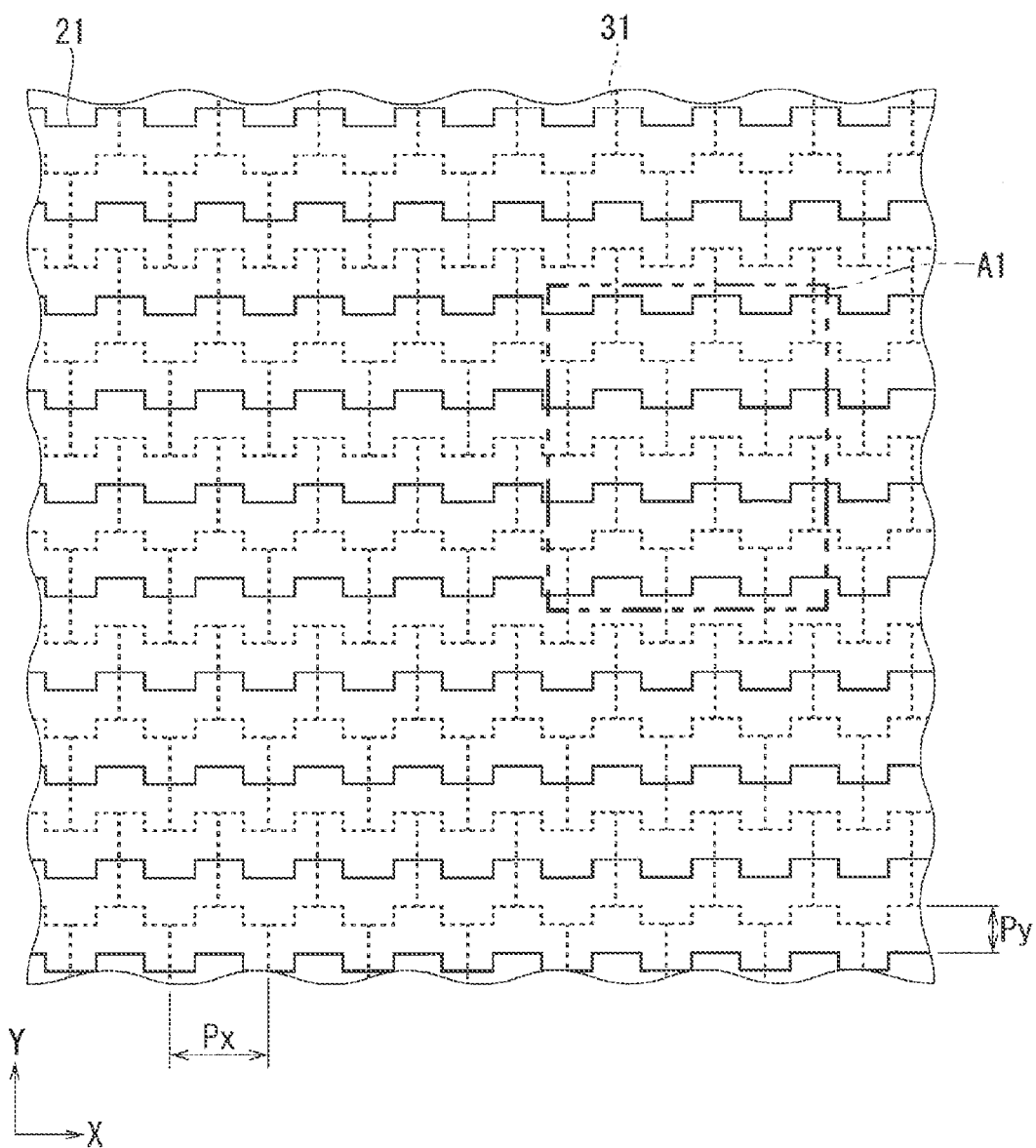

F I G. 26
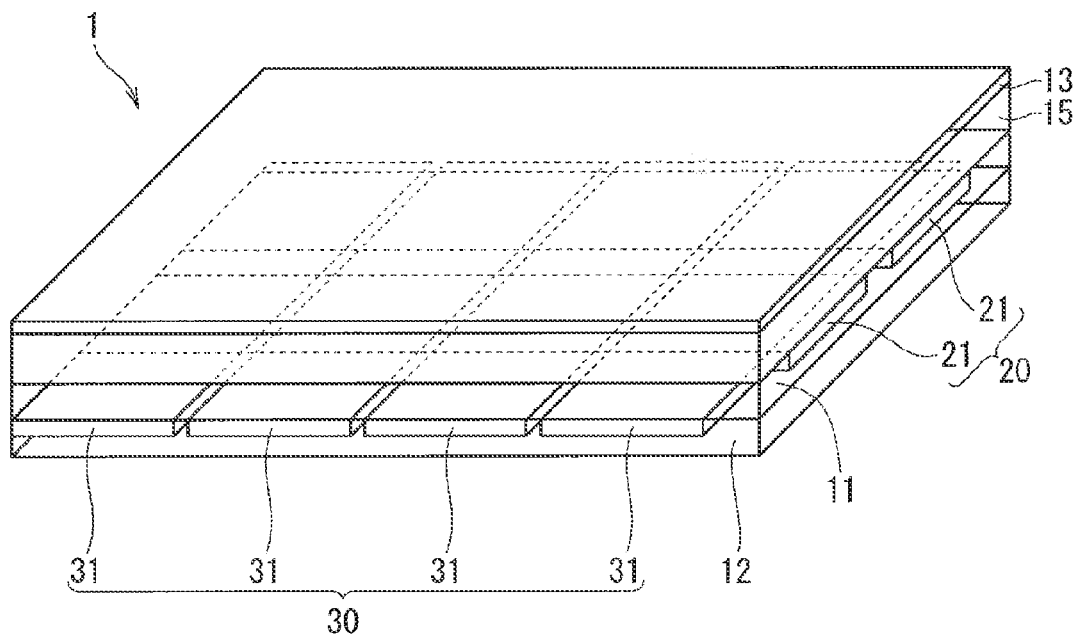
F I G. 27
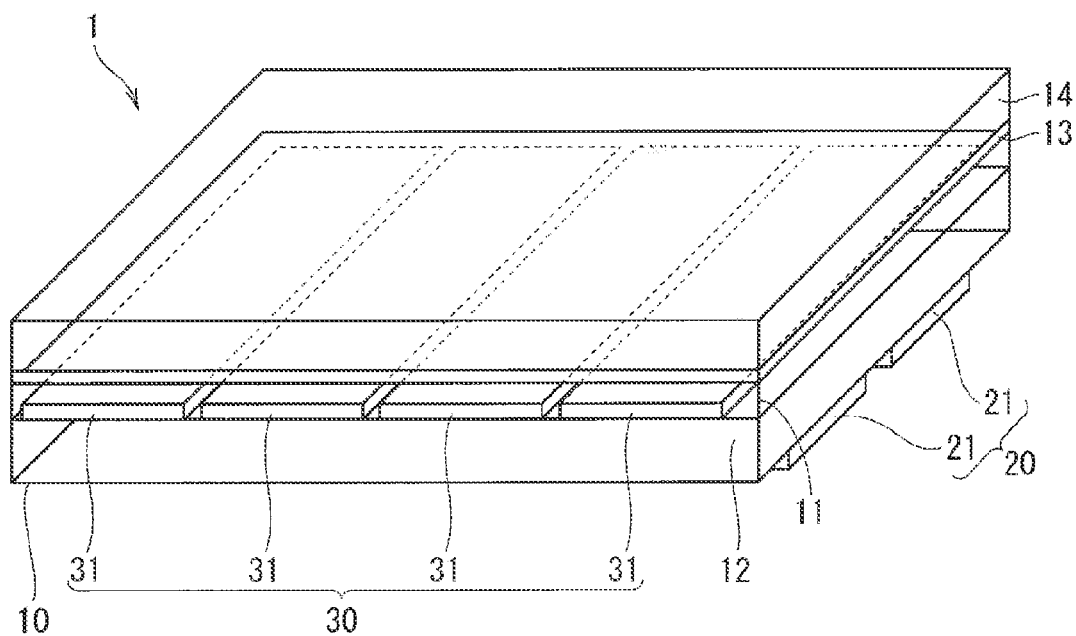

F I G. 3 1
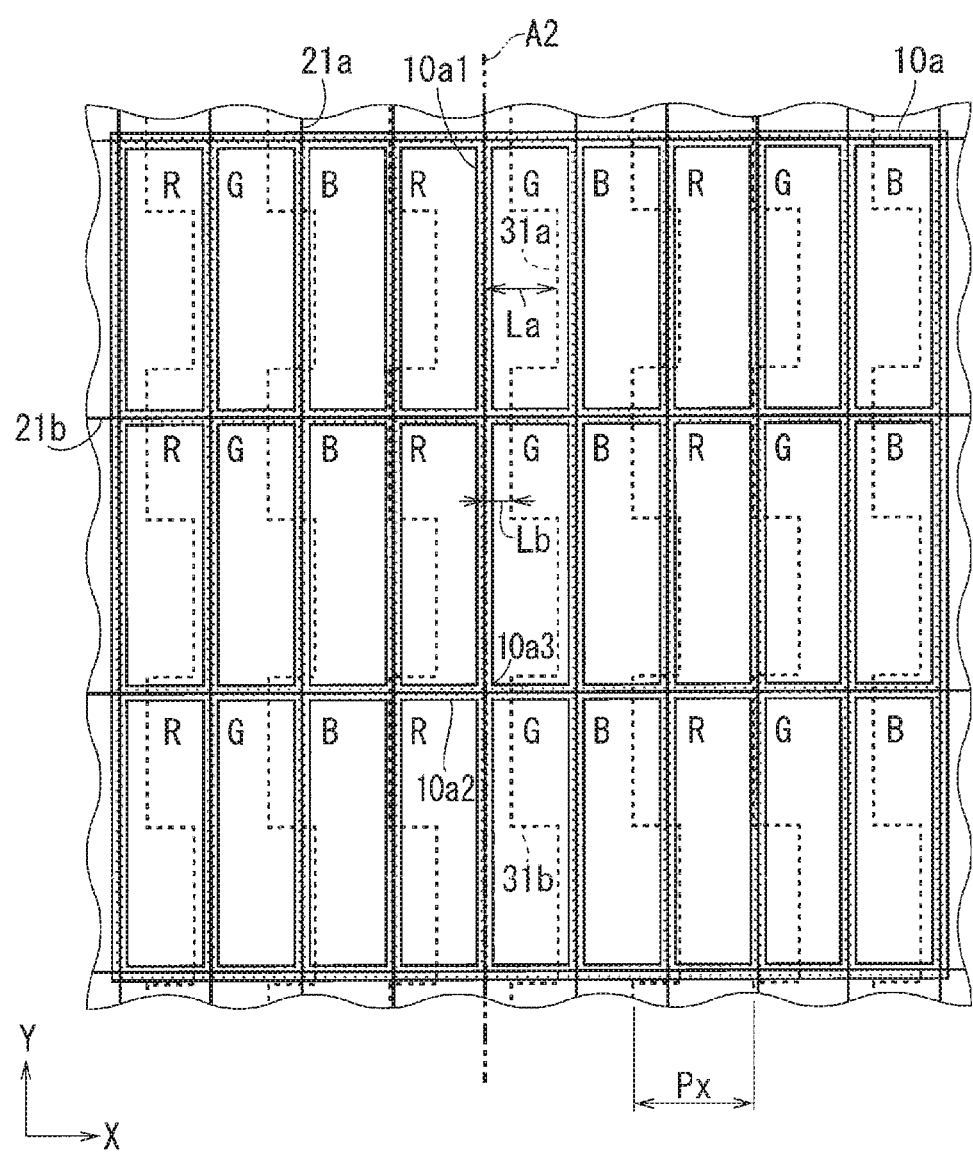

TOUCH SCREEN, TOUCH PANEL, DISPLAY, AND ELECTRONIC APPARATUS

BACKGROUND OF THE INVENTION

Field of the Invention

The present invention relates to a touch screen, a touch panel, a display, and an electronic apparatus.

Description of the Background Art

A touch panel is a device that detects a touch of a finger or the like and specifies coordinates of a position of the touch. A touch panel is attracting attention as one of excellent user interface means. Various types of touch panels such as resistive film touch panels and capacitive touch panels are commonly available now. A touch panel typically includes a touch screen with a built-in touch sensor and a detection device for specifying coordinates of a position of a touch based on a signal from the touch screen.

A projected capacitive touch panel is an example of the capacitive touch panel (for example, see Japanese Patent Application Laid-Open No. 2012-103761). The projected capacitive touch panel allows detection of a touch even if a front side of a touch screen with a built-in touch sensor is covered with a protective plate such as a glass plate having a thickness of approximately several millimeters. The touch panel of this type has excellent ruggedness since the protective plate can be disposed on the front side. Further, the touch panel can detect a touch even when a user touches it with gloves on. Moreover, the touch panel is long-lived because the touch panel has no movable part that is mechanically deformed.

The projected capacitive touch panel includes, as detection wiring for detecting capacitance, a first series of conductive elements formed on a thin dielectric film and a second series of conductive elements formed above the first series of conductive elements with an insulating film therebetween, for example. These series of conductive elements three-dimensionally intersect each other at a plurality of intersections without electrically contacting each other. A detection circuit detects capacitance formed between an indicator such as a finger and the first series of conductive elements and the second series of conductive elements as the detection wiring, to thereby specify coordinates of a position of a touch of the indicator. Such a detection method is commonly referred to as a self-capacitance detection method (for example, see Japanese Unexamined Patent Application Publication (Translation of PCT Application) No. 9-511086 (1997)).

For example, there is a detection method for detecting a change in electric field, namely, a change in mutual capacitance, between a plurality of row-direction wires extending in a row direction and a plurality of column-direction wires extending in a column direction to specify coordinates of a position of a touch. Such a detection method is commonly referred to as a mutual capacitance detection method (for example, see Japanese Unexamined Patent Application Publication (Translation of PCT Application) No. 2003-526831).

Both configurations of the self-capacitance method and the mutual capacitance method described above typically include a method for specifying, when an indicator such as a finger touches a planar area (detection cells) partitioned into a lattice pattern by the row-direction wires and the column-direction wires, coordinates of a position of the touch based on a balance between a detection value in a sensor block and a detection value in a detection cell near the sensor block.

In recent times, a touch panel formed of a fine-wire electrode made of a low-resistive metal material has been increasing instead of a touch panel made of a transparent conductive film such as indium tin oxide (ITO), which has been used, for the purpose of increasing size and speed of the touch panel. A liquid crystal module in which the touch panel including the fine-wire electrode is installed needs to suppress moiré caused by interference between a fine-wire electrode pattern and a black matrix (BM) pattern formed on a color filter (CF) substrate. For this matter, a technology of suppressing moiré by, for example, forming the fine-wire electrode and the black matrix so as to overlap each other in plan view is disclosed (for example, see Japanese Patent Application Laid-Open No. 2009-259063).

When a touch screen is mounted on the inner side of a polarizing plate on a display surface side of a liquid crystal panel in the liquid crystal module including the touch panel installed therein, a fine-wire electrode formed on the glass substrate for the touch screen may sometimes change, to an unexpected direction, a polarization direction of polarized light passing through a polarizing plate on the back side of the liquid crystal panel from a backlight. This causes a portion to be illuminated regardless of whether black is displayed, thereby lowering a contrast ratio.

Forming sensor wiring only in a direction of a polarization axis or a direction perpendicular to the polarization axis and forming the sensor wiring and a black matrix so as to overlap each other in plan view, as disclosed in Japanese Patent Application Laid-Open No. 2009-259063, are effective to suppress the decrease in the contrast ratio. However, if the sensor wiring is displaced from the black matrix due to manufacturing variations, portions having regular intervals between the sensor wiring and the black matrix relatively increase in length. Thus, interference of light easily occurs, which easily causes moiré.

SUMMARY OF THE INVENTION

The present invention has been made in view of the above-mentioned problems, and an object thereof is to provide a technology capable of improving display quality.

The present invention is a touch screen including a color filter substrate, first sensor wiring of metal, and a polarizing plate. The color filter substrate includes a black matrix disposed thereon, the black matrix having a plurality of first component portions that include components extending in a first direction and a plurality of second component portions that include components extending in a second direction perpendicular to the first direction, the black matrix having a plurality of openings surrounded by the first component portions and the second component portions. The first sensor wiring overlaps the color filter substrate in plan view and extends in the first direction or the second direction. The polarizing plate overlaps the color filter substrate in plan view and has a polarization axis in the first direction or the second direction. The first sensor wiring only includes a plurality of first partial wires extending in the first direction and a plurality of second partial wires extending in the second direction. A plurality of first lattice passing line segments are defined. The plurality of first lattice passing line segments extend in the first direction through lattice points adjacent to each other among a plurality of lattice points at which the plurality of first component portions and the plurality of second component portions of the black matrix are connected to each other. Ones of two or more first partial wires and two or more first lattice passing line segments are arranged in straight lines extending in the first direction, and the other ones are arranged along the first direction and located at unequal distances from the ones.

The visibility of moiré can be suppressed without lowering the contrast ratio.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a plan view showing an example of the lower electrode and the upper electrode of the touch screen according to the second preferred embodiment;

FIG. 24 is a plan view showing an example of the lower electrode and the upper electrode of the touch screen according to the fourth preferred embodiment;

FIG. 26 is a perspective view showing a layer structure of a touch screen according to a modification;

FIG. 27 is a perspective view showing a layer structure of a touch screen according to a fifth preferred embodiment;

FIG. 31 is an enlarged plan view showing an example of a region A1 according to the fifth preferred embodiment;

DESCRIPTION OF THE PREFERRED EMBODIMENTS

First Preferred Embodiment

Hereinafter, a touch screen 1 according to a first preferred embodiment of the present invention is described. In the following description, the touch screen 1 according to the first preferred embodiment is assumed to be a projected capacitive touch screen, but the touch screen 1 is not limited to this.

Figure 1:
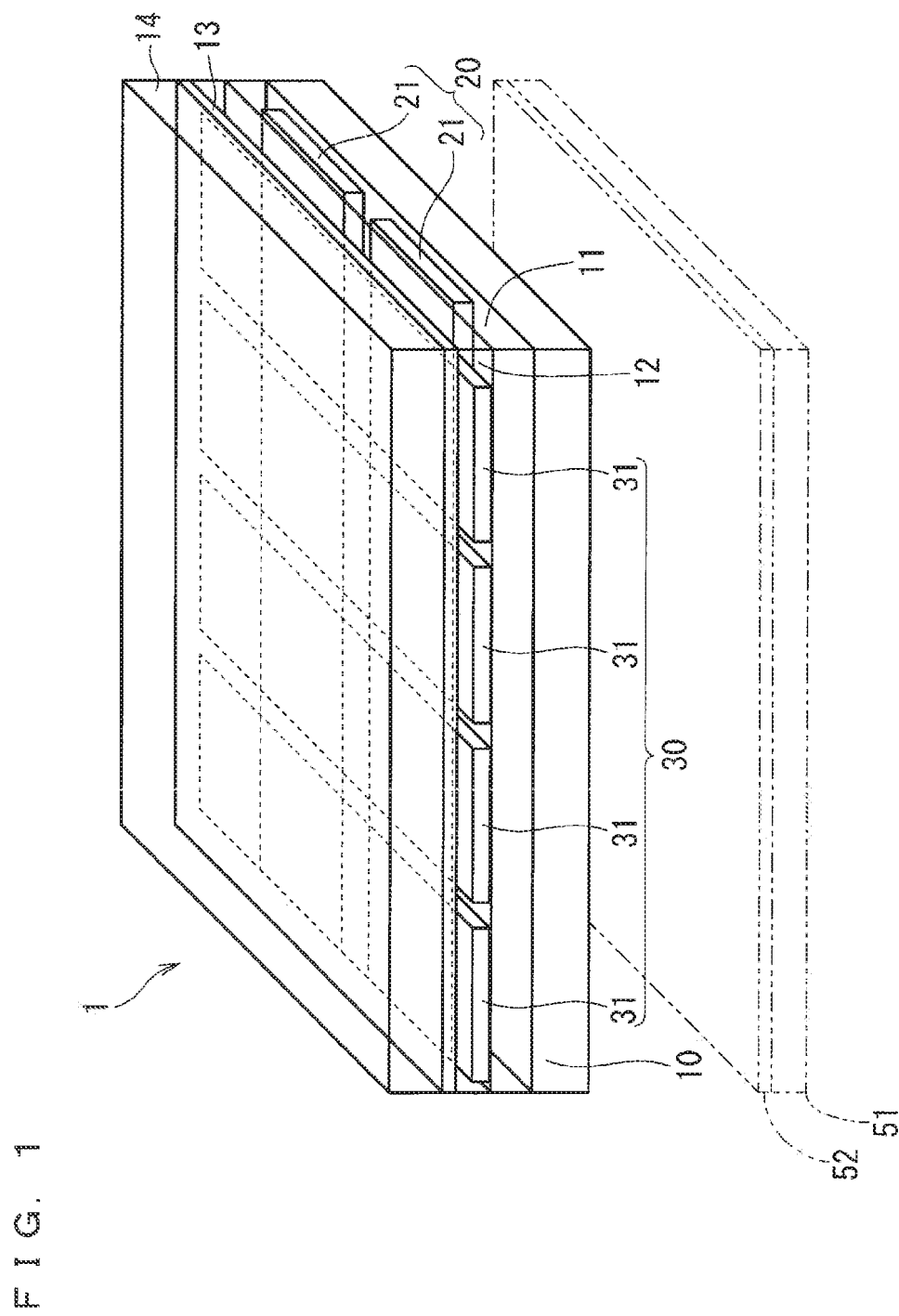
FIG. 1 is a perspective view showing a layer structure of a touch screen according to a first preferred embodiment.

FIG. 1 is a perspective view showing a layer structure of the touch screen 1 according to the first preferred embodiment. In FIG. 1, a lowest layer of the touch screen 1 is a color filter substrate 10 that is a substrate made of a transparent glass material or transparent resin and that includes a color filter disposed thereon. A black matrix having a plurality of openings (corresponding to a plurality of sub-pixels), which is not shown in FIG. 1, is disposed on the color filter substrate 10. The black matrix is described in detail below.

A lower electrode 20 is disposed above a surface (upper surface in FIG. 1), of the color filter substrate 10, opposite to the surface (lower surface in FIG. 1) on which the color filter is disposed. An interlayer insulating film 11 is disposed so as to cover the lower electrode 20. The interlayer insulating film 11 is a transparent insulating film such as a silicon nitride film and a silicon oxide film. An upper electrode 30 is disposed above an upper surface of the interlayer insulating film 11.

Furthermore, a protective film 12 is disposed on the upper surface of the interlayer insulating film 11 so as to cover the upper electrode 30. The protective film 12 is an insulating film having translucency such as a silicon nitride film, similarly to the interlayer insulating film 11. A polarizing plate 13 used for a display element (such as a liquid crystal display) on which the touch screen 1 is mounted is bonded to an upper surface of the protective film 12. A transparent substrate 14 made of a transparent glass material or transparent resin, for example, is adhering (bonded) to an upper surface of the polarizing plate 13 to protect the touch screen 1.

The lower electrode 20 includes a plurality of row-direction wires 21 made of a transparent wiring material such as indium tin oxide (ITO) or a metal wiring material such as aluminum. The upper electrode 30 similar to the lower electrode 20 includes a plurality of column-direction wires 31 made of a transparent wiring material such as ITO or a metal wiring material such as aluminum.

In the first preferred embodiment as described above, the row-direction wires 21 (first sensor wiring) of metal, the column-direction wires 31 (second sensor wiring) of metal, and the polarizing plate 13 are disposed so as to overlap the color filter substrate 10 in plan view.

In the first preferred embodiment, the column-direction wires 31 and the row-direction wires 21 that are mentioned above each have a multilayer structure including an aluminum-based alloy layer and a nitrided aluminum-based alloy layer. Such a structure can reduce wiring resistance and light reflectance in a detectable area. In the first preferred embodiment, the column-direction wires 31 are disposed in a layer above the row-direction wires 21, but the positional relationship may be reversed so that the row-direction wires 21 may be disposed in a layer above the column-direction wires 31. Moreover, the same materials, which are the aluminum-based alloy layer and the nitrided aluminum-based alloy layer in the multilayer structure, are used for the column-direction wires 31 and the row-direction wires 21, but these materials may not be the same. For example, the materials for the column-direction wires 31 are the aluminum-based alloy layer and the nitride aluminum-based alloy layer in the multilayer structure while the row-direction wires 21 may be made of a transparent wiring material such as ITO.

In the first preferred embodiment, the column-direction wires 31 are disposed in the layer above the row-direction wires 21. The column-direction wires 31 and the row-direction wires 21 may be disposed in the same layer, and the interlayer insulating film 11 may be disposed between the column-direction wires 31 and the row-direction wires 21 only in portions where they overlap each other in plan view to electrically separate them from each other.

A user touches the transparent substrate 14 being a surface of the touch screen 1 with an indicator such as a finger to perform operation. When the indicator touches the transparent substrate 14, capacitive coupling (touch capacitance) occurs between the indicator and at least ones of the row-direction wires 21 and the column-direction wires 31 below the transparent substrate 14. The self-capacitance method detects the touch capacitance to specify a position of the touch of the indicator in the detectable area.

FIG. 1 shows not only the touch screen 1 but also a display element 51 and an adhesive 52 indicated by phantom lines (dashed double-dotted lines). For example, a liquid crystal display element or a display panel such as a liquid crystal display (LCD) is used for the display element 51. In the following description, the touch screen 1 is assumed to be bonded to the display element 51 with the adhesive 52, but the touch screen 1 is not limited to this.

Figure 2:
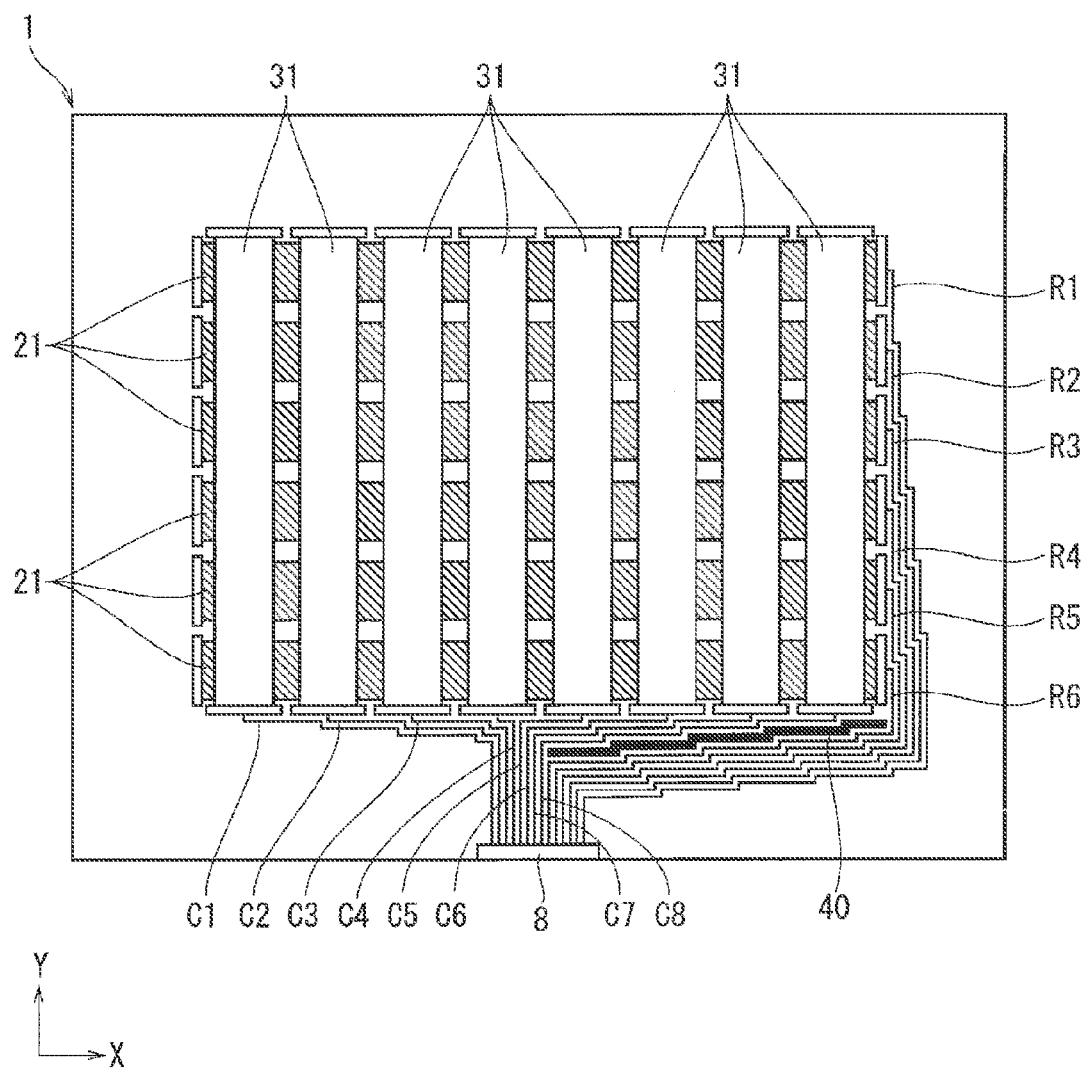
FIG. 2 is a plan view showing a configuration of the touch screen according to the first preferred embodiment.

FIG. 2 is a plan view showing a configuration of the touch screen 1 according to the first preferred embodiment. The detectable area of the touch screen 1 corresponds to a matrix region formed such that the plurality of row-direction wires 21 extending in the row direction (X direction, horizontal direction) and the plurality of column-direction wires 31 extending in the column direction (Y direction, vertical direction) overlap each other in plan view. In the following description, a first direction is assumed to be the column direction (Y direction, vertical direction) and a second direction is assumed to be the row direction (X direction, horizontal direction) perpendicular to the column direction.

The row-direction wires 21 are each connected, through lead-out wires R1 to R6, to a terminal 8 for connecting the row-direction wires 21 to external wiring. Similarly, the column-direction wires 31 are each connected, through lead-out wires C1 to C8, to the terminal 8 for connecting the column-direction wires 31 to external wiring.

The lead-out wires R1 to R6 are connected to the end portions of the row-direction wires 21 and extend along the periphery of the detectable area. Herein, the lead-out wire R5 extends along the lead-out wire R6 outside the lead-out wire R6 (on the side opposite to the detectable area) after reaching the lead-out wire R6 in the peripheral direction of the detectable area from the row-direction wire 21 connected to the lead-out wire R5. The lead-out wires R1 to R4 are disposed similarly to the lead-out wire R5.

In the first preferred embodiment, the lead-out wires R1 to R6 are disposed close to one another in the periphery of the detectable area. Similarly, the lead-out wires C1 to C8 are disposed close to one another in the periphery of the detectable area in the order in which the lead-out wire is closer to the terminal 8. By disposing the lead-out wires R1 to R6 and C1 to C8 as close to one another as possible in the periphery of the detectable area as described above, mainly, fringe capacitance between the display element 51 (FIG. 1) on which the touch screen 1 is mounted and each of the lead-out wires R1 to R6 and C1 to C8 can be suppressed. Thus, disposing such lead-out wires can reduce an influence of electromagnetic noise on the lead-out wires, the electromagnetic noise being generated from the display element 51 on which the touch screen 1 is mounted.

As shown in FIG. 2, a shield wire 40 to which reference potential such as ground potential is applied is disposed between the lead-out wire C8 and the lead-out wire R6. The shield wire 40 can reduce cross capacitance between the lead-out wire C8 and the lead-out wire R6. As a result, an error in detecting a touch position can be prevented.

Figure 3:
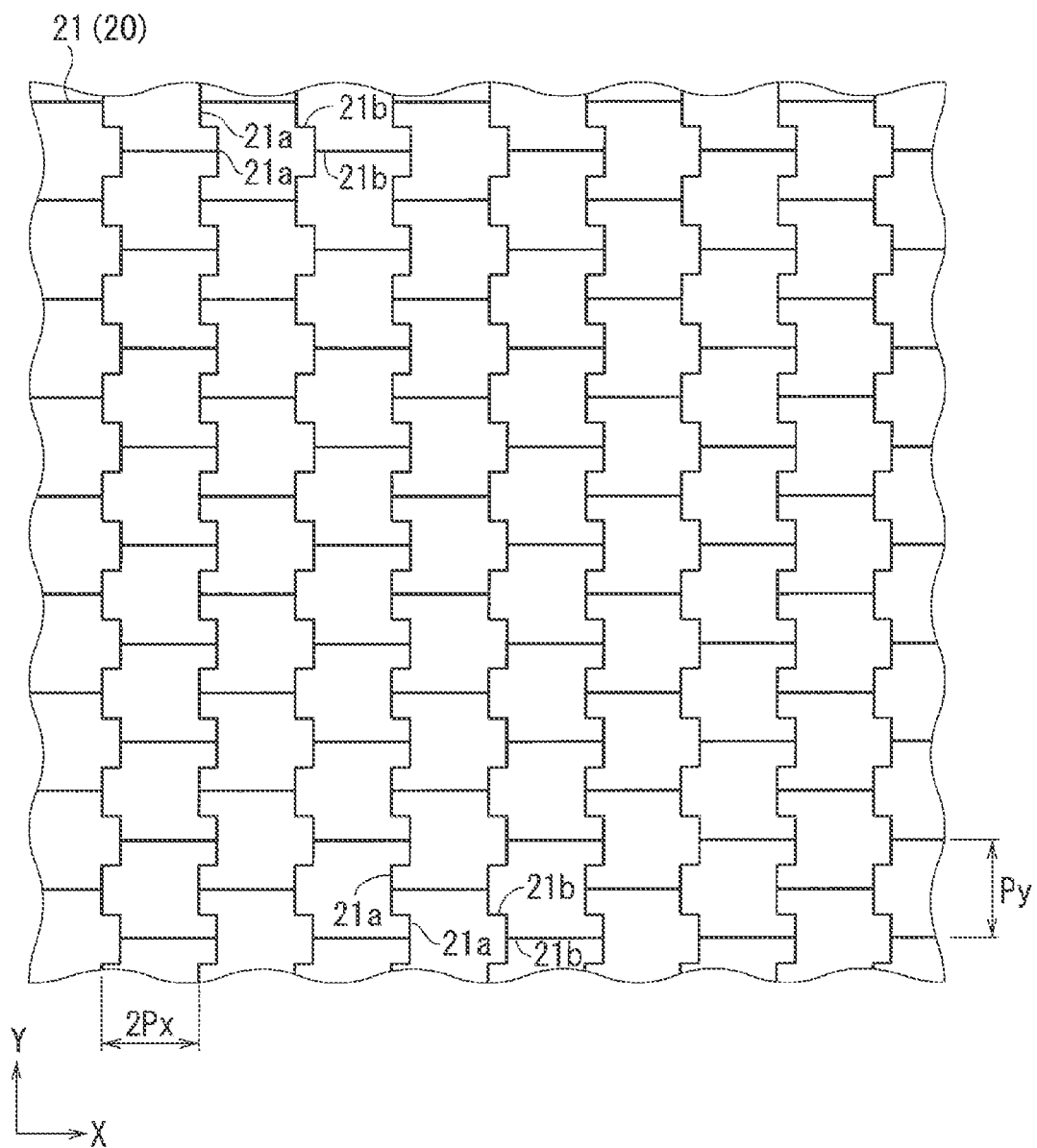
FIG. 3 is a plan view showing an example of a lower electrode of the touch screen according to the first preferred embodiment.
Figure 4:
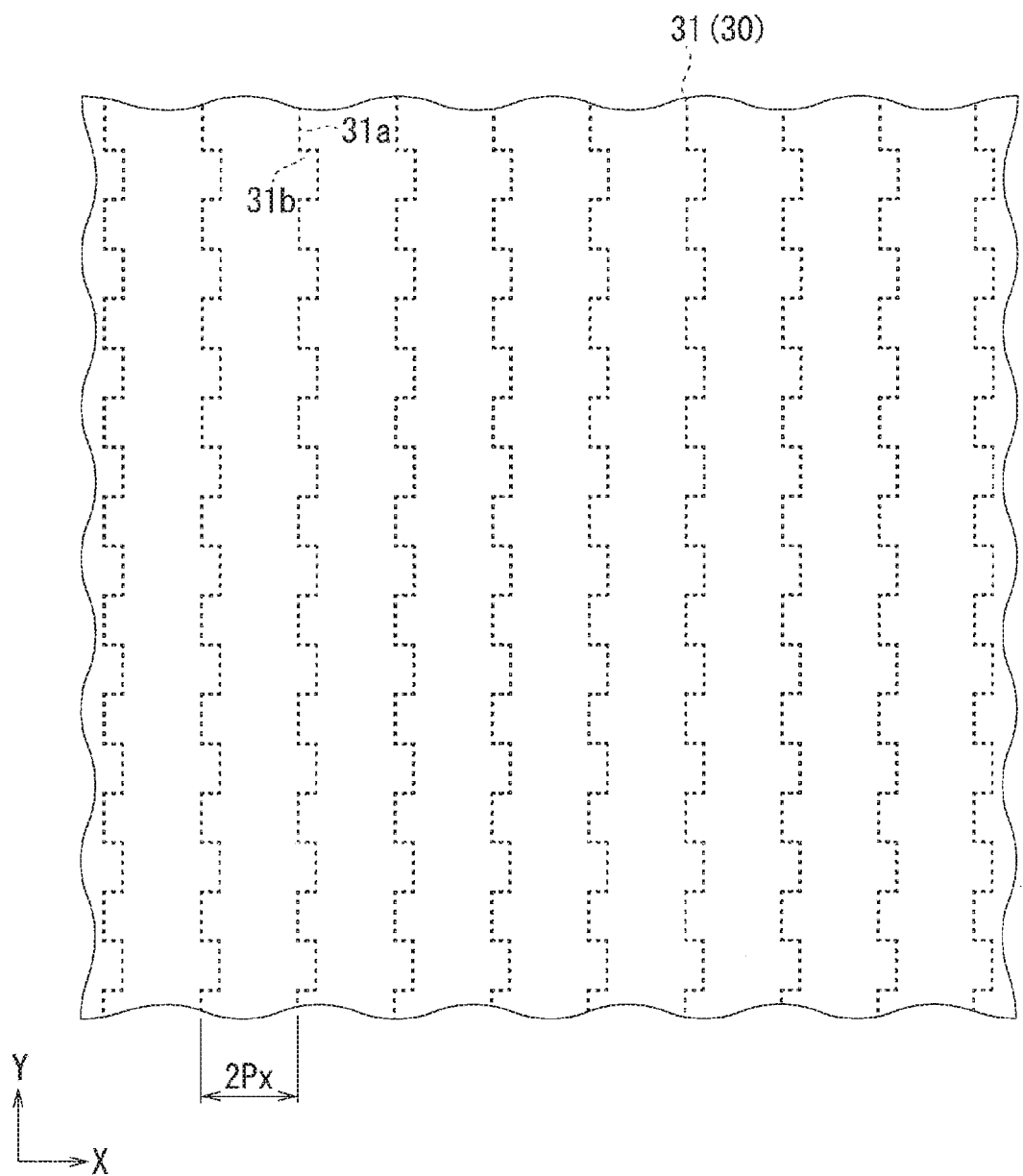
FIG. 4 is a plan view showing an example of an upper electrode of the touch screen according to the first preferred embodiment.
Figure 5:
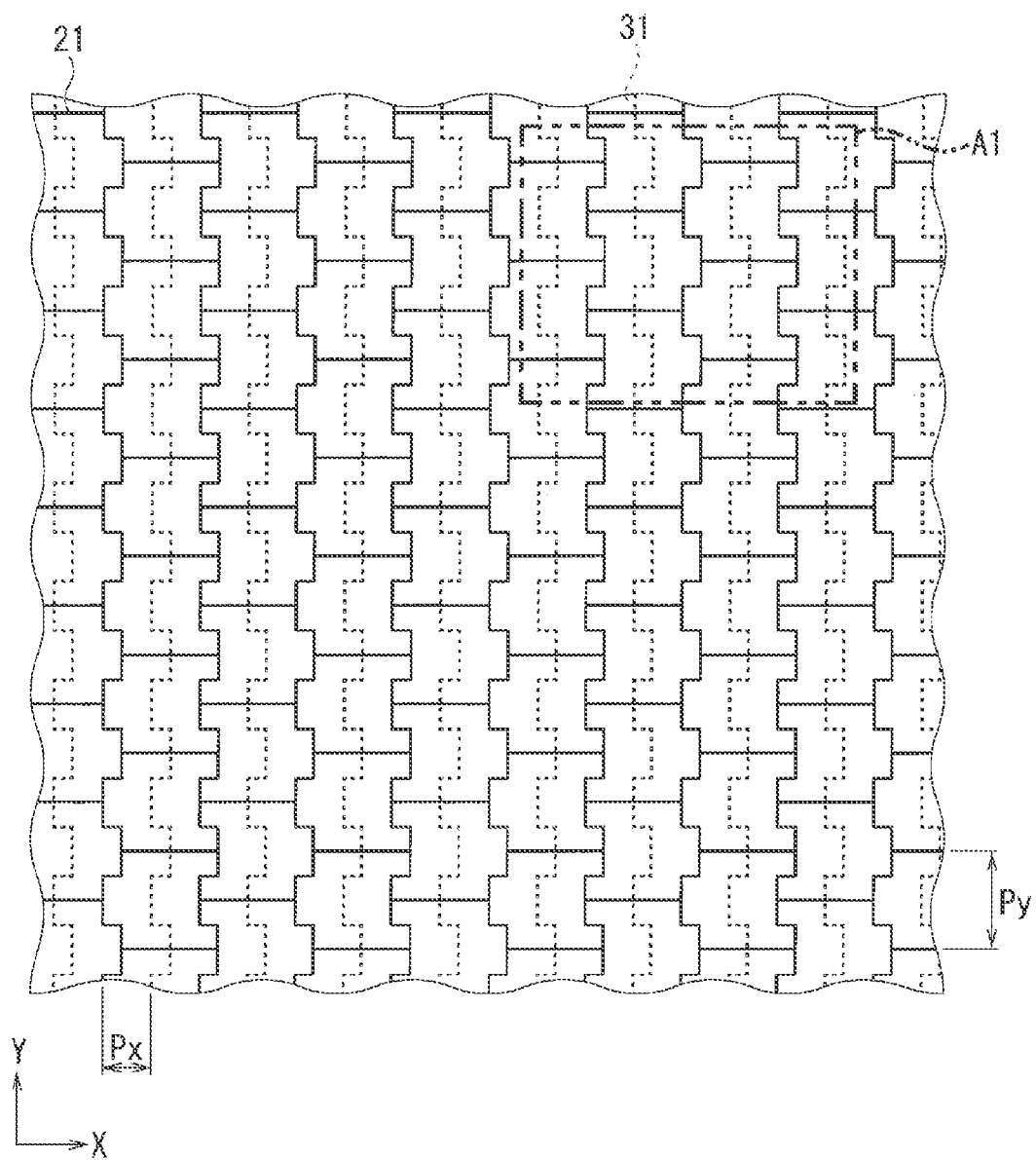
FIG. 5 is a plan view showing an example of the lower electrode and the upper electrode of the touch screen according to the first preferred embodiment.
Figure 6:
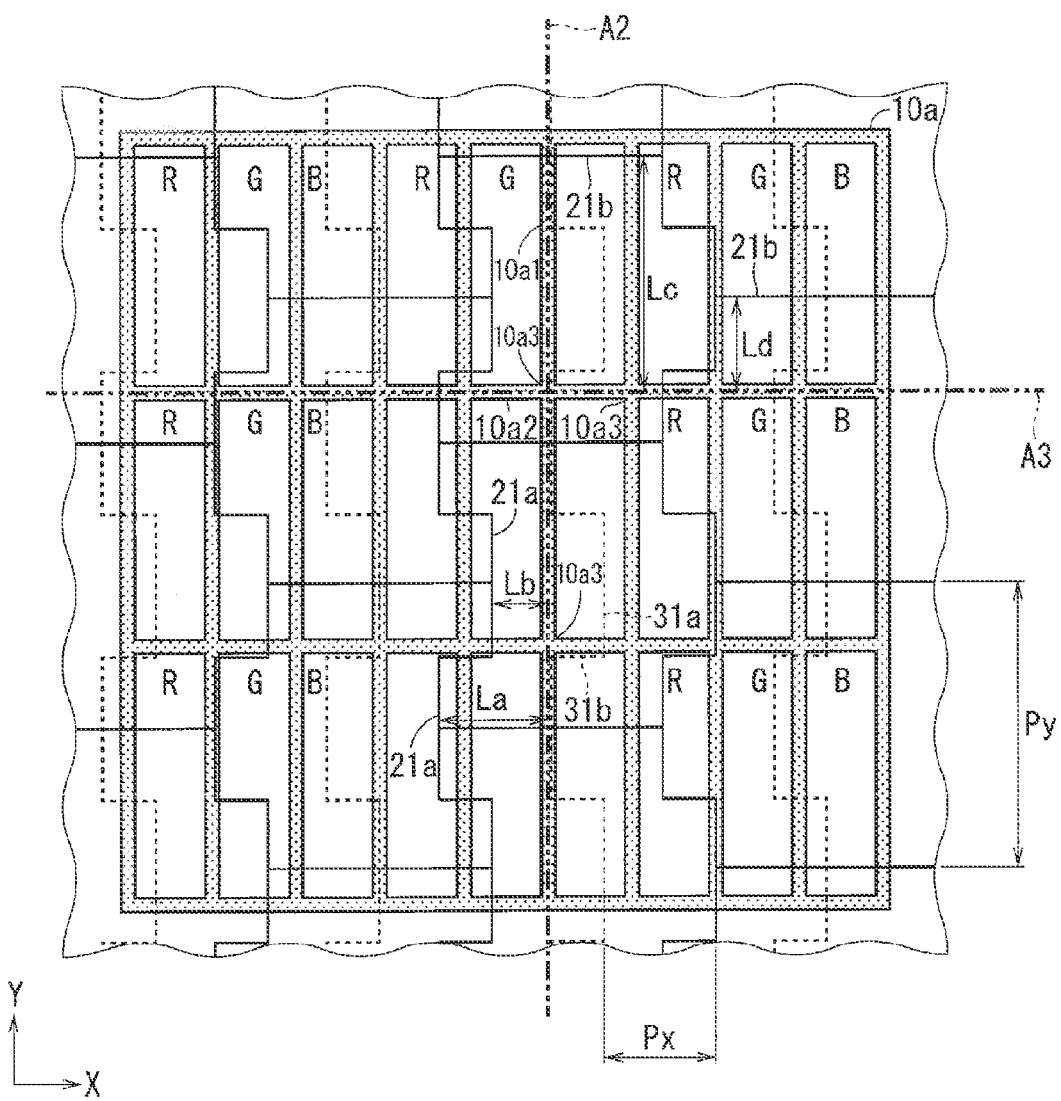
FIG. 6 is an enlarged plan view showing an example of a region A1 according to the first preferred embodiment.

Next, with reference to FIGS. 3 to 6, detailed structures of the row-direction wires 21 and the column-direction wires 31 are described. FIG. 3 is an enlarged plan view of the lower electrode 20 around a region in which the row-direction wires 21 and the column-direction wires 31 overlap each other in plan view. FIG. 4 is an enlarged plan view of the upper electrode 30 around a region in which the row-direction wires 21 and the column-direction wires 31 overlap each other in plan view. FIG. 5 is a plan view of the region in which the row-direction wires 21 and the column-direction wires 31 overlap each other in plan view. FIG. 6 is an enlarged view of a region A1 in FIG. 5. In FIGS. 3 to 6, an X direction (horizontal direction) is the row direction, and a Y direction (vertical direction) is the column direction. FIGS. 3 to 6 schematically show wiring patterns, so that wiring has a thickness and an interval different from actual dimensions. A polarization axis (polarization direction) by the polarizing plate 13 is assumed to be parallel to the column direction (Y direction).

As shown in FIG. 3, the row-direction wires 21 forming the lower electrode 20 are each formed of wires in a mesh pattern. The wires in the mesh pattern only include a plurality of conductor wires extending in a parallel direction or a perpendicular direction to the polarization direction by the polarizing plate 13. In other words, each of the row-direction wires 21 only includes a plurality of column partial wires for row (first partial wires) 21a extending in the column direction and a plurality of row partial wires for row (second partial wires) 21b extending in the row direction. The column partial wires for row 21a and the row partial wires for row 21b are connected to each other while forming a right angle at a bent portion. Each of the column partial wires for row 21a does not continue to linearly extend in the column direction, and each of the row partial wires for row 21b does not continue to linearly extend in the row direction.

Two or more column partial wires for row 21a are arranged at a predetermined interval (2Px) in the row direction. The row partial wires for row 21b connecting the column partial wires for row 21a have the same length as the interval (2Px). Two or more row partial wires for row 21b are arranged at a predetermined interval (Py) in the column direction.

As indicated by broken lines in FIG. 4, the column-direction wires 31 forming the upper electrode 30 are each formed of zigzag wires. The zigzag wires only include a plurality of conductor wires extending in the parallel direction or the perpendicular direction to the polarization direction by the polarizing plate 13. In other words, each of the column-direction wires 31 only includes a plurality of column partial wires for column (third partial wires) 31a extending in the column direction and a plurality of row partial wires for column (fourth partial wires) 31b extending in the row direction. The column partial wires for column 31a and the row partial wires for column 31b are connected to each other while forming a right angle at a bent portion. Each of the column partial wires for column 31a does not continue to linearly extend in the column direction, and each of the row partial wires for column 31b does not continue to linearly extend in the row direction.

Two or more column partial wires for column 31a are arranged at a second interval (2Px) twice as large as a first interval (Px), which is predetermined.

As shown in FIG. 5, wires (hereinafter referred to as "first combination wires") obtained by combining the column partial wires for row 21a and the column partial wires for column 31a in plan view are arranged at the above-mentioned first interval (Px) in the row direction. In the first preferred embodiment, the interval between the first combination wires is the same as an interval between the column partial wires for row 21a, which are not combined, of the row-direction wire 21 and an interval between the column partial wires for column 31a, which are not combined, of the column-direction wire 31. With this configuration, external-light reflectance in portions in which the row-direction wires 21 and the column-direction wires 31 intersect each other and external-light reflectance in portions except for the above-mentioned portions can be made uniform, so that the intersection portions can be prevented from being visually identified.

In the first preferred embodiment, the column partial wires for row 21a, the row partial wires for row 21b, the column partial wires for column 31a, and the row partial wires for column 31b each have a width of 3 μm. In the first preferred embodiment, the color filter substrate 10 has a thickness of 0.5 mm, the interval (Px) in the row direction is 100 μm, and the interval (Py) in the column direction is 300 μm. In the first preferred embodiment having the configuration as described above, the row-direction wires 21 and the column-direction wires 31 are wires forming the mesh pattern, which allows a wider detectable area to be covered with a smaller wiring area. It should be noted that a conductor width and a mesh interval of the row-direction wires 21 and the column-direction wires 31 may be different values from those in the first preferred embodiment according to the use of the touch screen 1.

FIG. 6 is an enlarged view of a region A1 in FIG. 5. A black matrix 10a indicated by a hatch pattern in FIG. 6 has a plurality of first component portions 10a1 that include components extending in the column direction and a plurality of second component portions 10a2 that include components extending in the row direction. In the first preferred embodiment, each of the first component portions 10a1 is formed of only the component extending in the column direction, and each of the second component portions 10a2 is formed of only the component extending in the row direction. The plurality of first component portions 10a1 and the plurality of second component portions 10a2 are connected to each other at a plurality of lattice points 10a3.

The black matrix 10a has openings (corresponding to sub-pixels) surrounded by the plurality of first component portions 10a1 and the plurality of second component portions 10a2. The openings have a rectangular shape whose long sides extend in the column direction. In addition, R, G, and B cyclically indicated in FIG. 6 represent red, green, and blue sub-pixels, respectively.

In the first preferred embodiment, a plurality of first lattice passing line segments A2 and a plurality of second lattice passing line segments A3 are defined. The first lattice passing line segments A2 are phantom lines that pass lattice points 10a3 adjacent to each other among a plurality of lattice points 10a3 of the black matrix 10a disposed on the color filter substrate 10 and that extend in the column direction. The second lattice passing line segments A3 are phantom lines that pass lattice points 10a3 adjacent to each other among the plurality of lattice points 10a3 of the black matrix 10a disposed on the color filter substrate 10 and that extend in the row direction.

Ones of two or more column partial wires for row 21a and two or more first lattice passing line segments A2 are arranged in straight lines extending in the column direction, and the other ones are arranged along the column direction and located at unequal distances from the ones. In the first preferred embodiment, two or more first lattice passing line segments A2 are arranged in the straight lines extending in the column direction, and two or more column partial wires for row 21a are arranged in a staggered manner along the column direction. As a result, distances La, Lb (La≠Lb) are unequal between the first lattice passing line segment A2 and the column partial wire for row 21a. Similarly, two or more column partial wires for column 31a are arranged in the staggered manner along the column direction, and distances are unequal between the first lattice passing line segment A2 and the column partial wire for column 31a.

Ones of two or more row partial wires for row 21b and two or more second lattice passing line segments A3 are arranged in straight lines extending in the row direction, and the other ones are arranged along the row direction and located at unequal distances from the ones. In the first preferred embodiment, two or more second lattice passing line segments A3 are arranged in the straight lines extending in the row direction, and two or more row partial wires for row 21b are arranged in the staggered manner along the row direction. As a result, distances Lc, Ld (Lc≠Ld) are unequal between the second lattice passing line segment A3 and the row partial wire for row 21b.

Conclusions of First Preferred Embodiment

In the touch screen 1 according to the first preferred embodiment as described above, ones of two or more column partial wires for row 21a and two or more first lattice passing line segments A2 are arranged in the straight lines extending in the column direction while the other ones are arranged along the column direction and located at the unequal distances from the ones. Therefore, portions having regular intervals between the column partial wires for row 21a and the black matrix 10a can be shortened, so that interference of light can be suppressed, which can suppress occurrence of moiré. The column partial wires for column 31a and the row partial wires for row 21b are also arranged similarly to the column partial wires for row 21a, so that the occurrence of moiré can be suppressed in the similar manner as described above.

The touch screen 1 according to the first preferred embodiment and a touch screen related to the first preferred embodiment (hereinafter referred to as a "related touch screen") are selectively mounted on the liquid crystal display to confirm a contrast ratio and visibility of moiré. Herein, a touch screen in which row-direction wires 21 and column-direction wires 31 have a linear shape without a bent portion and the wires and a black matrix have substantially regular intervals therebetween is used for the related touch screen.

As a result of the confirmation of the contrast ratio and the visibility of moiré, the touch screen 1 according to the first preferred embodiment and the related touch screen have almost the same contrast ratio. On the other hand, moiré having vertical stripes is clearly visually identified in the related touch screen while moiré having a zigzag pattern is slightly visually identified in the touch screen 1 according to the first preferred embodiment in which the visibility of the moiré is reduced more than that in the related touch screen.

The row-direction wires 21 and the column-direction wires 31 are disposed in the parallel direction and the perpendicular direction to the polarization axis by the polarizing plate 13, and the wires are prevented from being disposed at regular distances from the first lattice passing line segments A2 extending in the column direction. This can therefore suppress light leakage when the liquid crystal display displays black to the same level of light leakage in the related touch screen. Moreover, moiré (interference of light) caused by the row-direction wires 21, the column-direction wires 31, and the black matrix 10a can be suppressed more than that in the related touch screen. Therefore, even when the row-direction wires 21 and the column-direction wires 31 overlap each other in plan view above the polarizing plate 13 on the display surface side, a touch screen in which the moiré is hardly visually identified can be achieved without lowering the contrast ratio (while maintaining the contrast ratio at the current level).

Modifications of First Preferred Embodiment

Transparent conductive materials such as ITO and graphene or metal materials such as aluminum, chromium, copper, and silver may be used as materials for the row-direction wires 21 and the column-direction wires 31. Alternatively, the row-direction wires 21 and the column-direction wires 31 may be made of an alloy of aluminum, chromium, copper, and silver, or may have a multilayer structure in which aluminum nitride is formed on the alloy. The row-direction wires 21 and the column-direction wires 31 may be made of materials different from those in the first preferred embodiment according to the use of the touch screen 1.

In the first preferred embodiment, the openings (corresponding to the sub-pixels) of the black matrix 10a each have the rectangular shape formed by the sides extending in the row direction and the column direction, but the shape is not limited to this.

Figure 7:
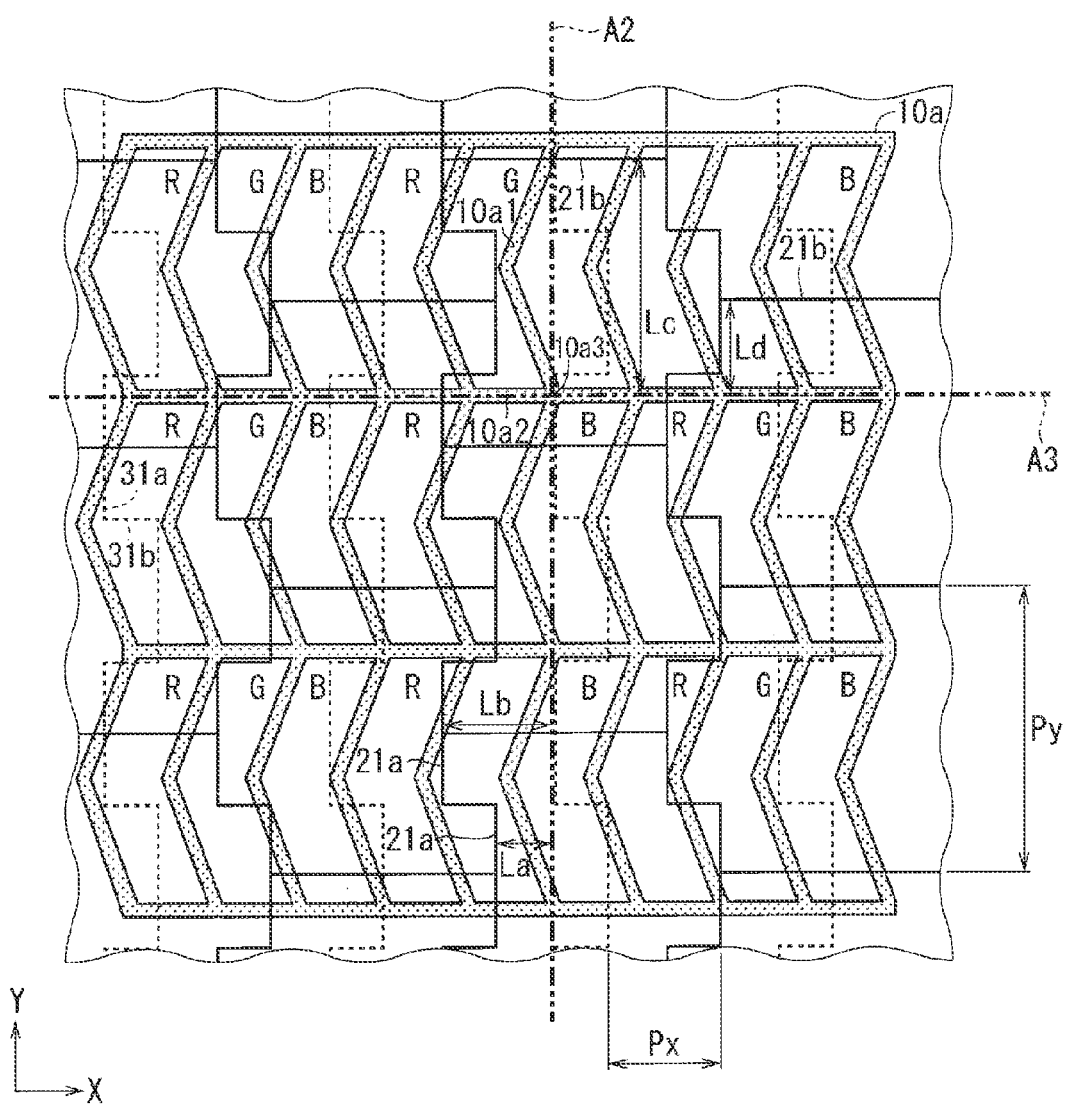
FIG. 7 is an enlarged plan view showing an example of a region A1 according to a modification.

For example, as shown in FIG. 7, the openings (corresponding to the sub-pixels) of the black matrix 10a may each have such a shape that the two long sides of the above-mentioned rectangle are replaced with sides of a V-shape. In other words, the first component portion 10a1 of the black matrix 10a may be formed of a component that combines a component extending in the column direction and a component extending in the row direction. The second component portion 10a2 of the black matrix 10a may be formed of a component that combines a component extending in the column direction and a component extending in the row direction, but it is not shown. In any of the cases, any of the distances between the first lattice passing line segment A2 and the column partial wire for row 21a, the distances between the first lattice passing line segment A2 and the column partial wire for column 31a, and the distances between the second lattice passing line segment A3 and the row partial wire for row 21b are unequal. Therefore, the occurrence of moiré can be suppressed in the similar manner as described above.

Figure 8:
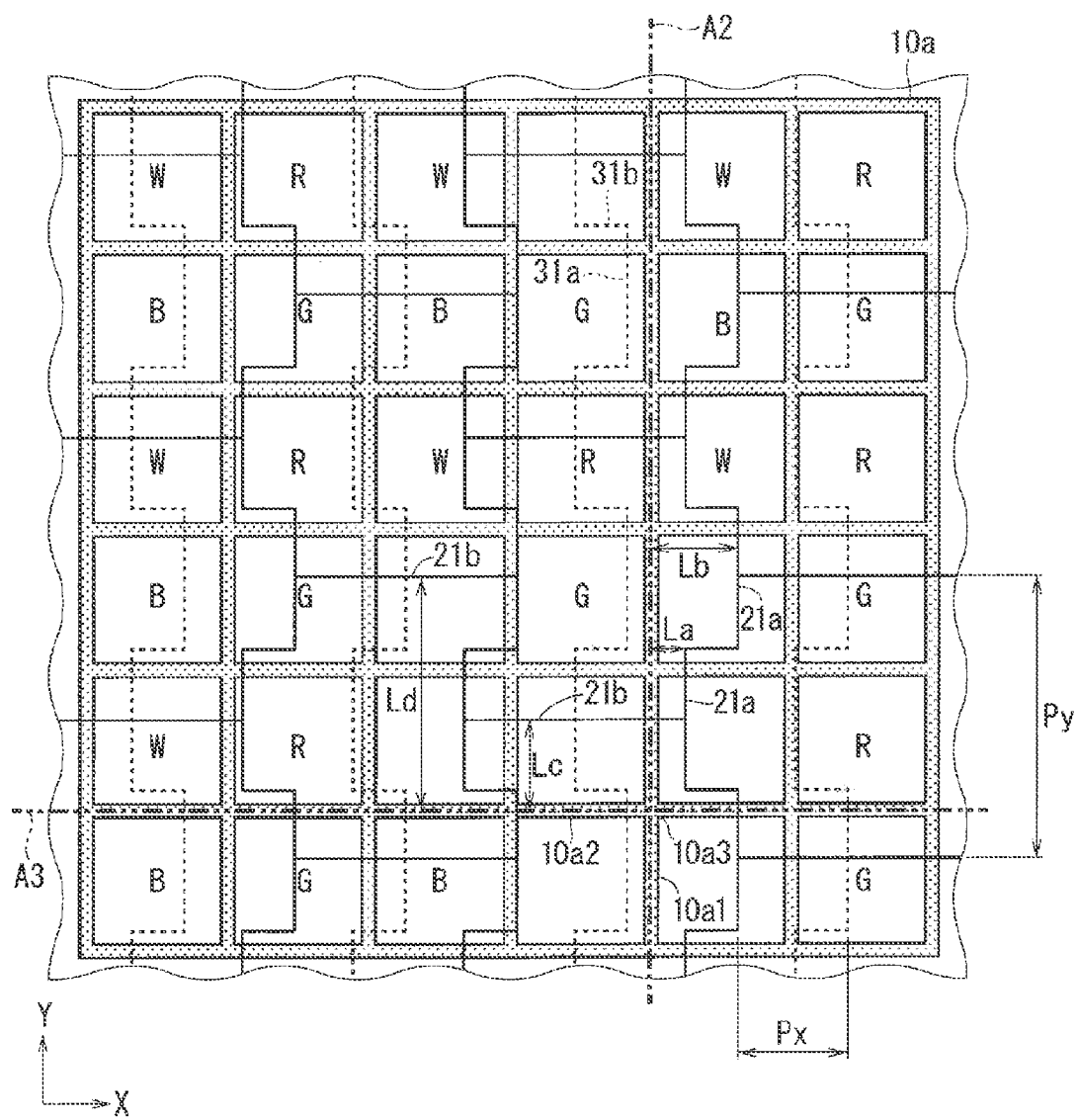
FIG. 8 is an enlarged plan view showing another example of the region A1 according to the modification.

For example, as shown in FIG. 8, the openings (corresponding to the sub-pixels) of the black matrix 10a may each have a square shape in which a pair of opposite sides extend in the column direction. Also in this case, any of the distances between the first lattice passing line segment A2 and the column partial wire for row 21a, the distances between the first lattice passing line segment A2 and the column partial wire for column 31a, and the distances between the second lattice passing line segment A3 and the row partial wire for row 21b are unequal. Therefore, the occurrence of moiré can be suppressed in the similar manner as described above. W shown in FIG. 8 represents white sub-pixels.

Figure 9:
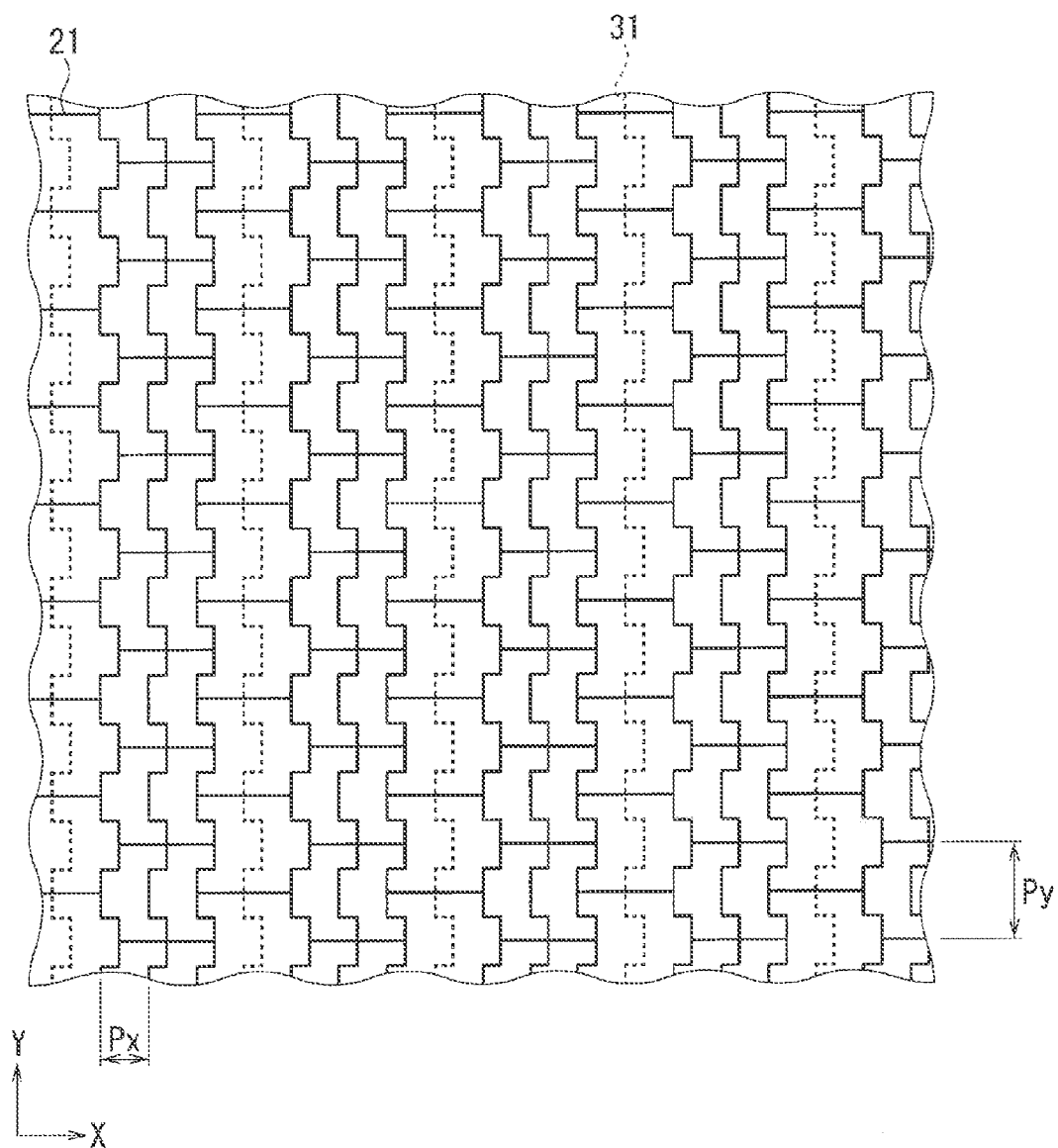
FIG. 9 is a plan view showing an example of a lower electrode and an upper electrode of a touch screen according to the modification.

As the first preferred embodiment, an excellent example is shown in which the column partial wires for row 21a, the row partial wires for row 21b, and the column partial wires for column 31a are each arranged at regular intervals, but they may not be arranged at regular intervals. In the first preferred embodiment, the column partial wires for row 21a and the column partial wires for column 31a are each arranged at the second interval (2Px), and the above-mentioned first combination wires are arranged uniformly at the first interval (Px). However, the structure is not limited to this, and as shown in FIG. 9, for example, the row partial wires for row 21b or the column partial wires for column 31a may be arranged at a second interval (nPx) n times (n is a positive integer and n=3 in FIG. 9) as large as the first interval (Px), and combination wires of these wires may be arranged uniformly at the first interval (Px).

Second Preferred Embodiment

In the first preferred embodiment, the portions, which extend in the column direction, of the row-direction wires 21 and the column-direction wires 31 have the zigzag pattern, so that zigzag moiré pattern is slightly visually identified. A second preferred embodiment of the present invention is different from the first preferred embodiment in that row-direction wires 21 and column-direction wires 31 have a pattern such as a checkered pattern. The second preferred embodiment having such a configuration can suppress the occurrence of the moiré pattern and prevent eyes of people from identifying the moiré. In addition, a cross-sectional structure of a touch screen 1 and a structure of lead-out wires are similar to the structures shown in FIGS. 1 and 2 of the first preferred embodiment, and thus the descriptions are omitted.

Figure 10:
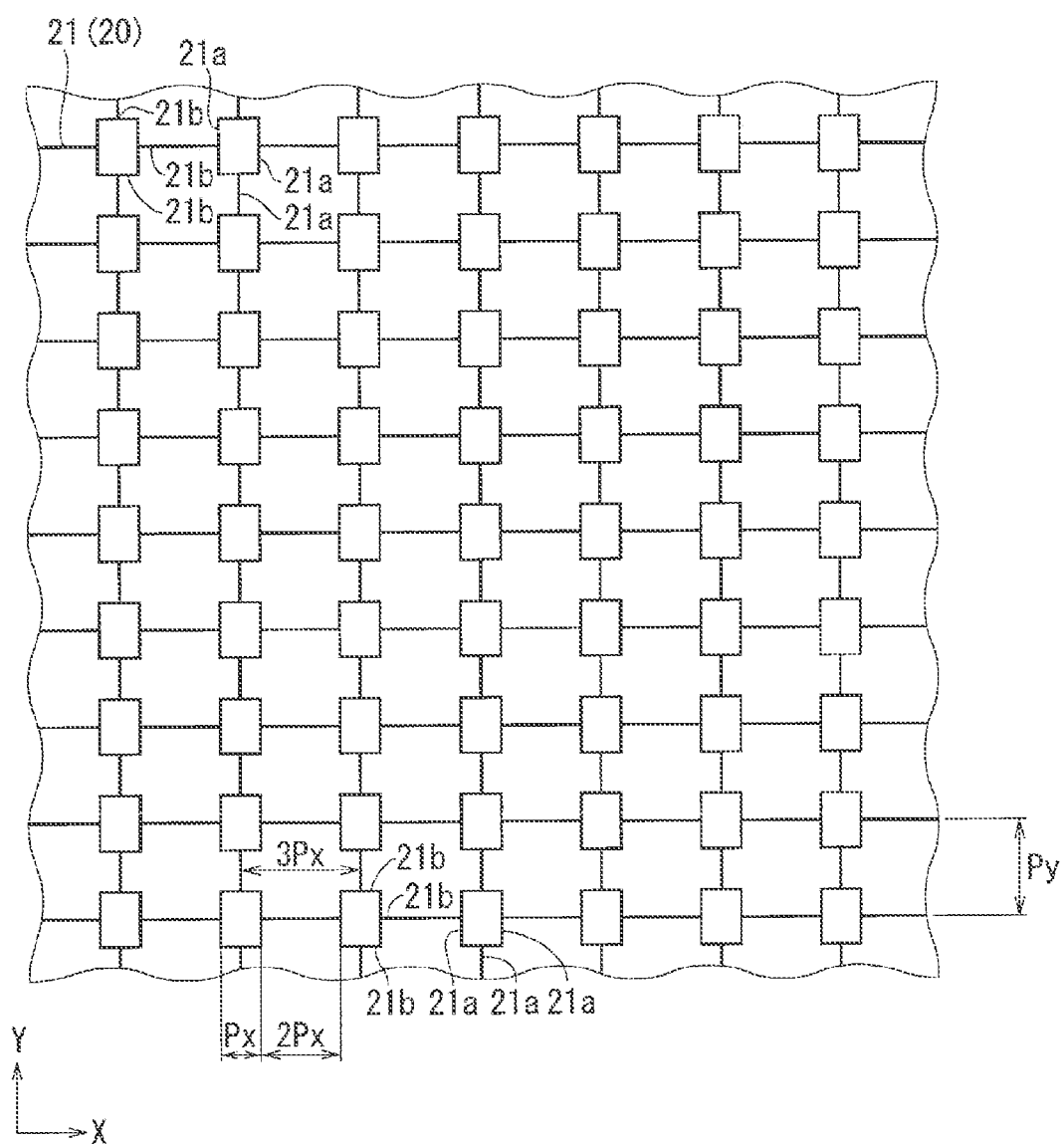
FIG. 10 is a plan view showing an example of a lower electrode of a touch screen according to a second preferred embodiment.
Figure 11:
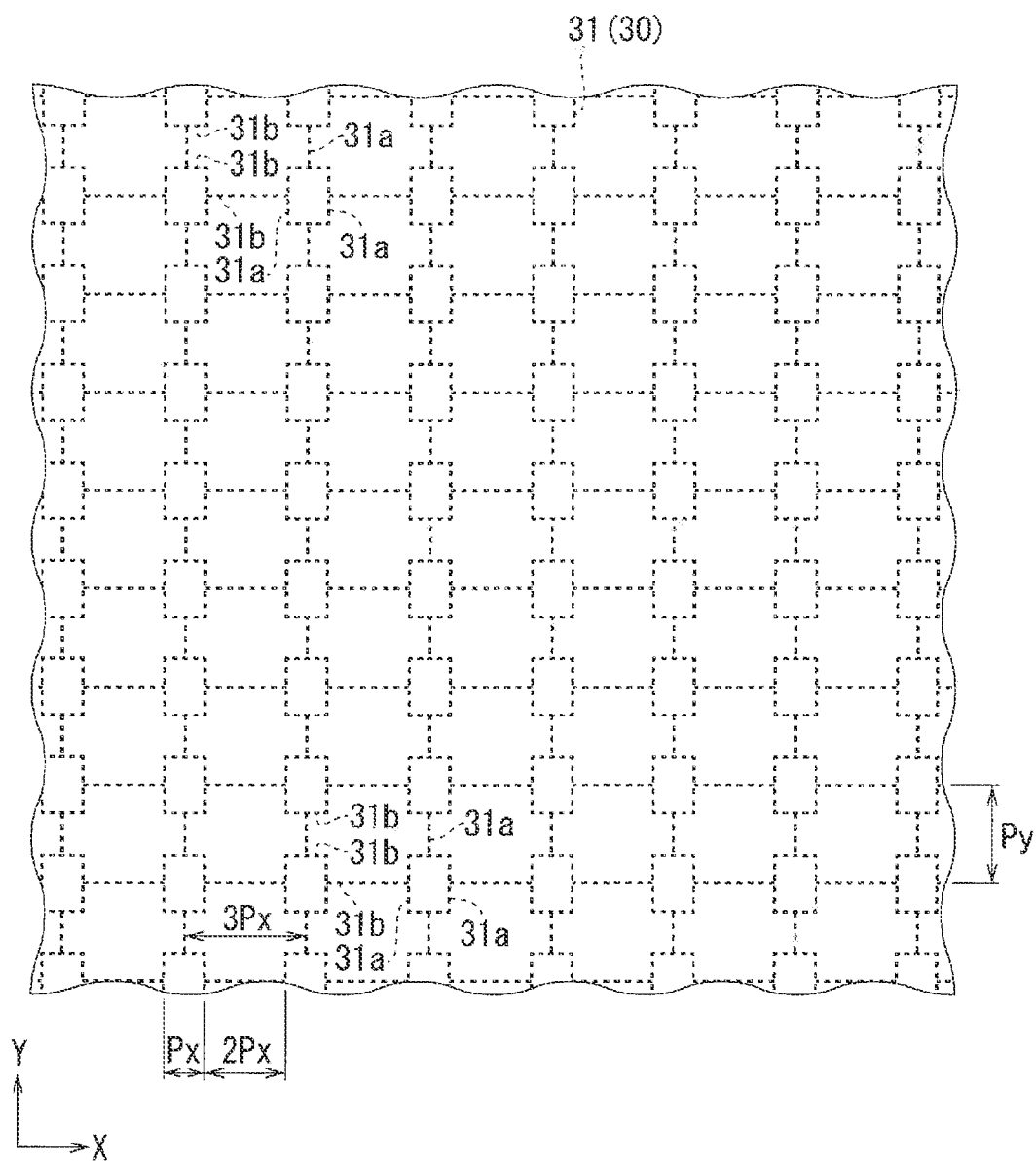
FIG. 11 is a plan view showing an example of an upper electrode of the touch screen according to the second preferred embodiment.
Figure 13:
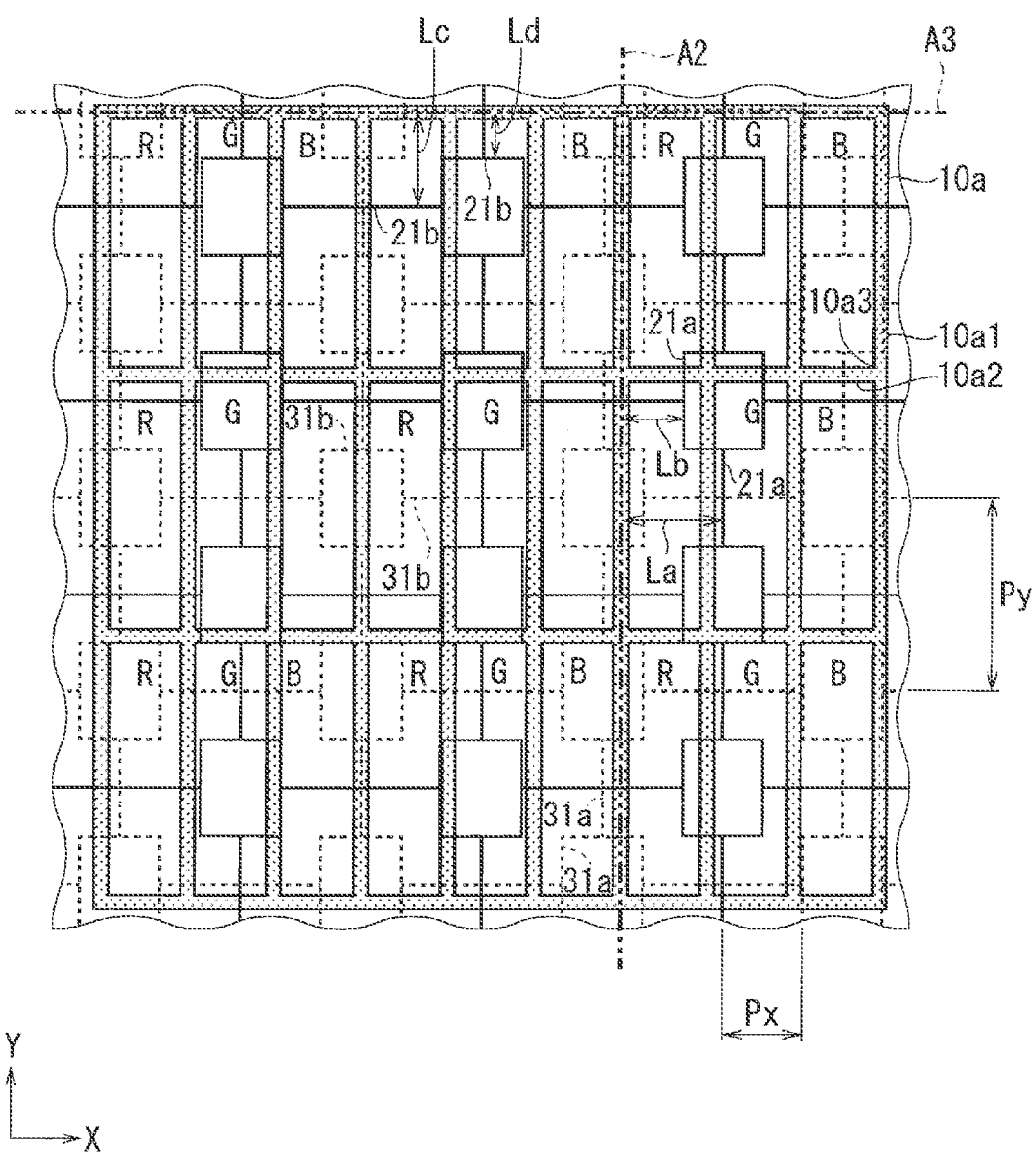
FIG. 13 is an enlarged plan view showing an example of a region A1 according to the second preferred embodiment.

With reference to FIGS. 10 to 13, detailed structures of the row-direction wires 21 and the column-direction wires 31 are described. FIG. 10 is an enlarged plan view of a lower electrode 20 around a region in which the row-direction wires 21 and the column-direction wires 31 overlap each other in plan view. FIG. 11 is an enlarged plan view of an upper electrode 30 around a region in which the row-direction wires 21 and the column-direction wires 31 overlap each other in plan view. FIG. 12 is a plan view of the region in which the row-direction wires 21 and the column-direction wires 31 overlap each other in plan view. FIG. 13 is an enlarged view of a region A1 in FIG. 12. In FIGS. 10 to 13, an X direction (horizontal direction) is the row direction, and a Y direction (vertical direction) is the column direction. FIGS. 10 to 13 schematically show wiring patterns, so that wiring has a thickness and an interval different from actual dimensions. A polarization axis (polarization direction) by a polarizing plate 13 is assumed to be parallel to the column direction (Y direction).

As shown in FIG. 10, the row-direction wires 21 forming the lower electrode 20 are each formed of wires in a mesh pattern. The wires in the mesh pattern only include a plurality of conductor wires extending in a parallel direction or a perpendicular direction to the polarization direction by the polarizing plate 13. In other words, each of the row-direction wires 21 only includes a plurality of column partial wires for row (first partial wires) 21a extending in the column direction and a plurality of row partial wires for row (second partial wires) 21b extending in the row direction. The column partial wires for row 21a and the row partial wires for row 21b are connected to each other while forming a right angle at a bent portion. Each of the column partial wires for row 21a does not continue to linearly extend in the column direction, and each of the row partial wires for row 21b does not continue to linearly extend in the row direction.

One column partial wire for row 21a and two column partial wires for row 21a that are alternately disposed in the column direction are connected to each other through the row partial wires for row 21b. Herein, upper ends and lower ends of the two column partial wires for row 21a are each connected to both ends of two row partial wires for row 21b, thereby forming an annular wire having a rectangular shape. Then, annular wires vertically adjacent to each other are connected to each other with the one column partial wire for row 21a.

The column partial wires for row 21a, which connect the annular wires to each other, of two or more column partial wires for row 21a are arranged at a predetermined interval (3Px) in the row direction. The column partial wires for row 21a forming the annular wires are arranged at alternating intervals (Px) (2Px) in the row direction. The row partial wire for row 21b connecting the column partial wires for row 21a arranged at the interval (2Px) has the same length as the interval (2Px). Two or more row partial wires for row 21b are arranged at a predetermined interval (Py) in the column direction.

As indicated by broken lines in FIG. 11, the column-direction wires 31 forming the upper electrode 30 are each formed of wires in the mesh pattern. The wires in the mesh pattern only include a plurality of conductor wires extending in the parallel direction or the perpendicular direction to the polarization direction by the polarizing plate 13. In other words, each of the column-direction wires 31 only includes a plurality of column partial wires for column (third partial wires) 31a extending in the column direction and a plurality of row partial wires for column (fourth partial wires) 31b extending in the row direction. The column partial wires for column 31a and the row partial wires for column 31b are connected to each other while forming a right angle at a bent portion. Each of the column partial wires for column 31a does not continue to linearly extend in the column direction, and each of the row partial wires for column 31b does not continue to linearly extend in the row direction.

One column partial wire for column 31a and two column partial wires for column 31a that are alternately disposed in the column direction are connected to each other through the row partial wires for column 31b. Herein, upper ends and lower ends of the two column partial wires for column 31a are each connected to both ends of two row partial wires for column 31b, thereby forming an annular wire having a rectangular shape. Then, annular wires vertically adjacent to each other are connected to each other with the one column partial wire for column 31a.

The column partial wires for column 31a, which connect the annular wires to each other, of two or more column partial wires for column 31a are arranged at a second interval (3Px) three times as large as a first interval (Px), which is predetermined, in the row direction. The column partial wires for column 31a forming the annular wires are arranged alternately at the first interval (Px) and the second interval (2Px) twice as large as the first interval (Px) in the row direction. The row partial wire for column 31b connecting the column partial wires for column 31a arranged at the second interval (2Px) has the same length as the interval (2Px). Two or more row partial wires for column 31b are arranged at a predetermined interval (Py) in the column direction.

As shown in FIG. 12, first combination wires (wires obtained by combining the column partial wires for row 21a and the column partial wires for column 31a in plan view) are arranged at the above-mentioned first interval (Px) in the row direction. In the second preferred embodiment, the interval between the first combination wires is the same as an interval between the column partial wires for row 21a, which are not combined, of the row-direction wire 21 and an interval between the column partial wires for column 31a, which are not combined, of the column-direction wire 31. With this configuration, external-light reflectance in portions in which the row-direction wires 21 and the column-direction wires 31 intersect each other and external-light reflectance in portions except for the above-mentioned portions can be made uniform, so that the intersection portions can be prevented from being visually identified.

In the second preferred embodiment, the column partial wires for row 21a, the row partial wires for row 21b, the column partial wires for column 31a, and the row partial wires for column 31b each have a width of 3 µm. In the second preferred embodiment, the color filter substrate 10 has a thickness of 0.5 mm, the interval (Px) in the row direction is 100 µm, and the interval (Py) in the column direction is 300 µm. In the second preferred embodiment having the configuration as described above, the row-direction wires 21 and the column-direction wires 31 are wires forming the mesh pattern, which allows a wider detectable area to be covered with a smaller wiring area. It should be noted that a conductor width and a mesh interval of the row-direction wires 21 and the column-direction wires 31 may be different values from those in the second preferred embodiment according to the use of the touch screen 1.

FIG. 13 is an enlarged view of a region A1 in FIG. 12. Similarly to the first preferred embodiment, a black matrix 10a indicated by a hatch pattern in FIG. 13 has a plurality of first component portions 10a1 and a plurality of second component portions 10a2 that are connected to each other at a plurality of lattice points 10a3. The black matrix 10a has openings (corresponding to sub-pixels) having a rectangular shape whose long sides extend in the column direction. R, G, and B cyclically indicated in FIG. 13 represent red, green, and blue sub-pixels, respectively.

In the second preferred embodiment similar to the first preferred embodiment, a plurality of first lattice passing line segments A2 and a plurality of second lattice passing line segments A3 are defined. Ones of two or more column partial wires for row 21a and two or more first lattice passing line segments A2 are arranged in straight lines extending in the column direction, and the other ones are arranged along the column direction and located at unequal distances from the ones. In the second preferred embodiment, two or more first lattice passing line segments A2 are arranged in the straight lines extending in the column direction, and two or more column partial wires for row 21a are arranged in a staggered manner along the column direction. As a result, distances La, Lb (La≠Lb) are unequal between the first lattice passing line segment A2 and the column partial wire for row 21a. Similarly, two or more column partial wires for column 31a are arranged in the staggered manner along the column direction, and distances are unequal between the first lattice passing line segment A2 and the column partial wire for column 31a.

Ones of two or more row partial wires for row 21b and two or more second lattice passing line segments A3 are arranged in straight lines extending in the row direction, and the other ones are arranged along the row direction and located at unequal distances from the ones. In the second preferred embodiment, two or more second lattice passing line segments A3 are arranged in the straight lines extending in the row direction, and two or more row partial wires for row 21b are arranged in the staggered manner along the row direction. As a result, distances Lc, Ld (Lc≠Ld) are unequal between the second lattice passing line segment A3 and the row partial wire for row 21b. Similarly, two or more row partial wires for column 31b are arranged in the staggered manner along the column direction, and distances are unequal between the second lattice passing line segment A3 and the row partial wire for column 31b.

Conclusions of Second Preferred Embodiment

In the touch screen 1 according to the second preferred embodiment as described above, ones of two or more column partial wires for row 21a and two or more first lattice passing line segments A2 are arranged in the straight lines extending in the column direction while the other ones are arranged along the column direction and located at the unequal distances from the ones in the similar manner as the first preferred embodiment. Therefore, portions having regular intervals between the column partial wires for row 21a and the black matrix 10a can be shortened, so that interference of light can be suppressed, which can suppress occurrence of moiré. The column partial wires for column 31a, the row partial wires for row 21b, and the row partial wires for column 31b are also arranged similarly to the column partial wires for row 21a, so that the occurrence of moiré can be suppressed in the similar manner as described above.

The touch screen 1 according to the second preferred embodiment and the touch screen according to the first preferred embodiment are selectively mounted on the liquid crystal display to confirm a contrast ratio and visibility of moiré. As a result, the touch screen 1 according to the second preferred embodiment and the touch screen according to the first preferred embodiment have almost the same contrast ratio. On the other hand, the moiré having the zigzag pattern is slightly visually identified in the touch screen 1 according to the first preferred embodiment while the visibility of the moiré is further reduced in the touch screen 1 according to the second preferred embodiment.

The row-direction wires 21 and the column-direction wires 31 are disposed in the parallel direction and the perpendicular direction to the polarization axis by the polarizing plate 13, and the wires are prevented from being disposed at regular distances from the first lattice passing line segments A2 extending in the column direction, and furthermore, the wires have the checkered pattern. This can therefore suppress light leakage when the liquid crystal display displays black to the same level of light leakage in the touch screen according to the first preferred embodiment. Moreover, moiré (interference of light) caused by the row-direction wires 21, the column-direction wires 31, and the black matrix 10a can be suppressed more than that in the touch screen 1 according to the first preferred embodiment. Therefore, even when the row-direction wires 21 and the column-direction wires 31 overlap each other in plan view above the polarizing plate 13 on the display surface side, a touch screen in which the moiré is hardly visually identified can be achieved without lowering the contrast ratio.

Modifications of Second Preferred Embodiment

Transparent conductive materials such as ITO and graphene or metal materials such as aluminum, chromium, copper, and silver may be used as materials for the row-direction wires 21 and the column-direction wires 31. Alternatively, the row-direction wires 21 and the column-direction wires 31 may be made of an alloy of aluminum, chromium, copper, and silver, or may have a multilayer structure in which aluminum nitride is formed on the alloy. The row-direction wires 21 and the column-direction wires 31 may be made of materials different from those in the second preferred embodiment according to the use of the touch screen 1.

In the second preferred embodiment, the openings (corresponding to the sub-pixels) of the black matrix 10a each have the rectangular shape formed by the sides extending in the row direction and the column direction, but the shape is not limited to this.

Figure 14:
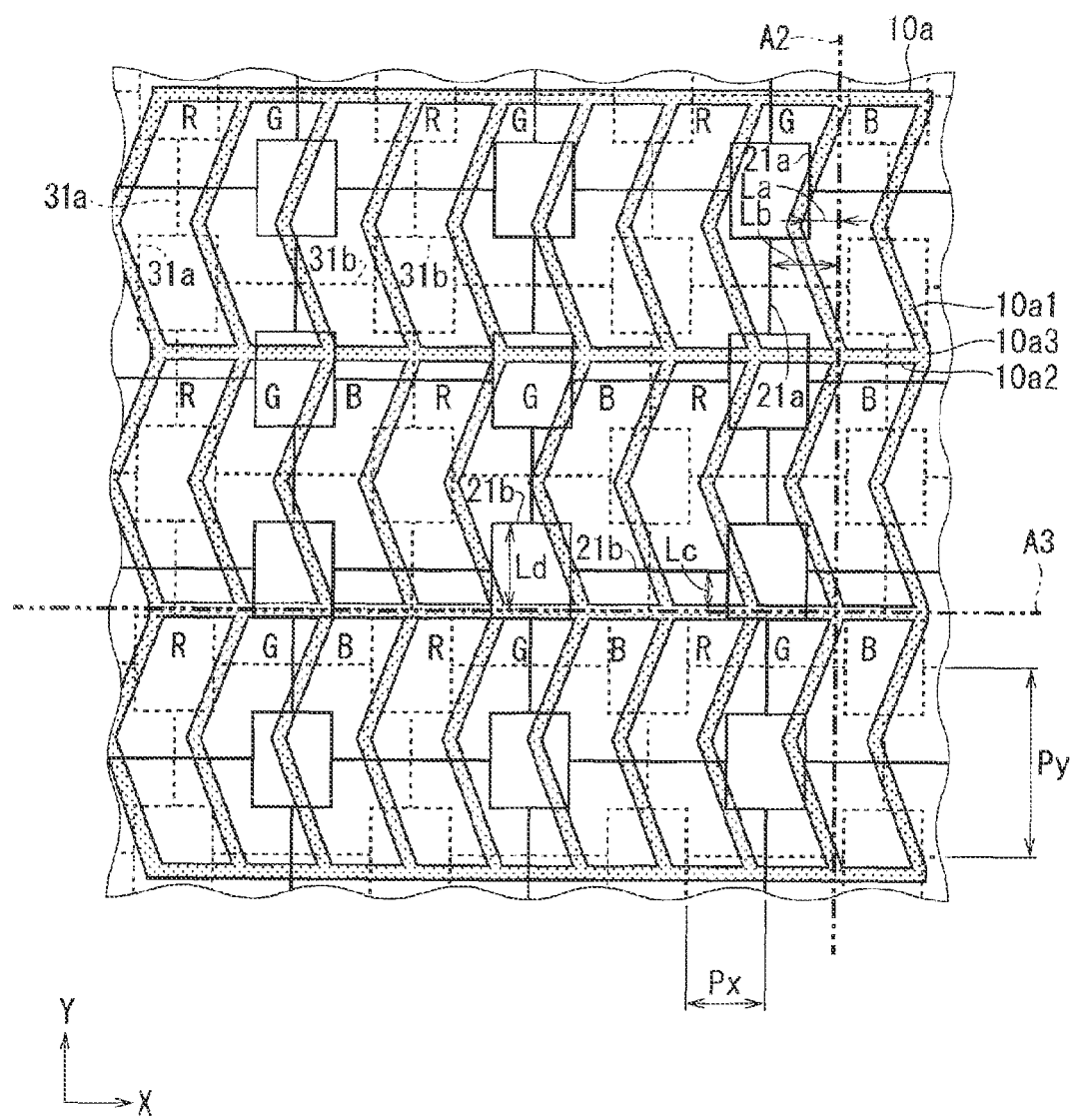
FIG. 14 is an enlarged plan view showing an example of a region A1 according to a modification.

For example, as shown in FIG. 14, the openings (corresponding to the sub-pixels) of the black matrix 10a may each have such a shape that the two long sides of the above-mentioned rectangle are replaced with sides of a V-shape. In other words, the first component portion 10a1 of the black matrix 10a may be formed of a component that combines a component extending in the column direction and a component extending in the row direction. The second component portion 10a2 of the black matrix 10a may be formed of a component that combines a component extending in the column direction and a component extending in the row direction, but it is not shown. In any of the cases, any of the distances between the first lattice passing line segment A2 and the column partial wire for row 21a, the distances between the first lattice passing line segment A2 and the column partial wire for column 31a, the distances between the second lattice passing line segment A3 and the row partial wire for row 21b, and the distances between the second lattice passing line segment A3 and the row partial wire for column 31b are unequal. Therefore, the occurrence of moiré can be suppressed in the similar manner as described above.

Figure 15:
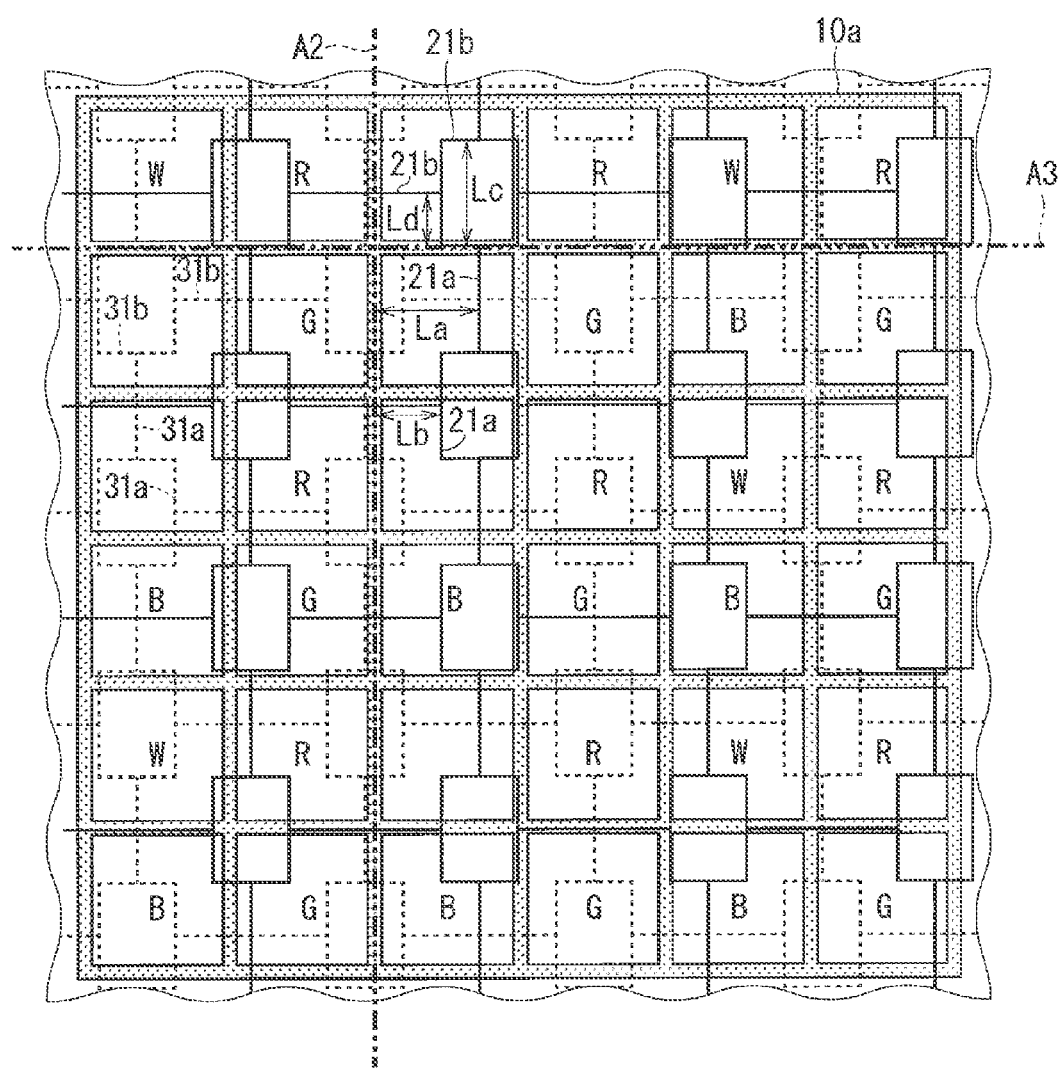
FIG. 15 is an enlarged plan view showing another example of the region A1 according to the modification.

For example, as shown in FIG. 15, the openings (corresponding to the sub-pixels) of the black matrix 10a may each have a square shape in which a pair of opposite sides extend in the column direction. Also in this case, any of the distances between the first lattice passing line segment A2 and the column partial wire for row 21a, the distances between the first lattice passing line segment A2 and the column partial wire for column 31a, the distances between the second lattice passing line segment A3 and the row partial wire for row 21b, and the distances between the second lattice passing line segment A3 and the row partial wire for column 31b are unequal. Therefore, the occurrence of moiré can be suppressed in the similar manner as described above. W shown in FIG. 15 represents white sub-pixels.

As the second preferred embodiment, an excellent example is shown in which the column partial wires for row 21a, the row partial wires for row 21b, and the column partial wires for column 31a are each arranged at regular intervals, but they may not be arranged at regular intervals.

Third Preferred Embodiment

In the first and second preferred embodiments, each of two or more first lattice passing line segments A2 and each of two or more second lattice passing line segments A3 are arranged in the straight line while each of two or more column partial wires for row 21a, each of two or more row partial wires for row 21b, each of two or more column partial wires for column 31a, and each of two or more row partial wires for column 31b are not arranged in the straight line. In contrast, the positional relationships are reversed in a third preferred embodiment. In other words, each of two or more column partial wires for row 21a, each of two or more row partial wires for row 21b, each of two or more column partial wires for column 31a, and each of two or more row partial wires for column 31b are arranged in the straight line while each of two or more first lattice passing line segments A2 and each of two or more second lattice passing line segments A3 are not arranged in the straight line. In addition, a cross-sectional structure of a touch screen 1 and a structure of lead-out wires are similar to the structures shown in FIGS. 1 and 2 of the first preferred embodiment, and thus the descriptions are omitted.

Figure 16:
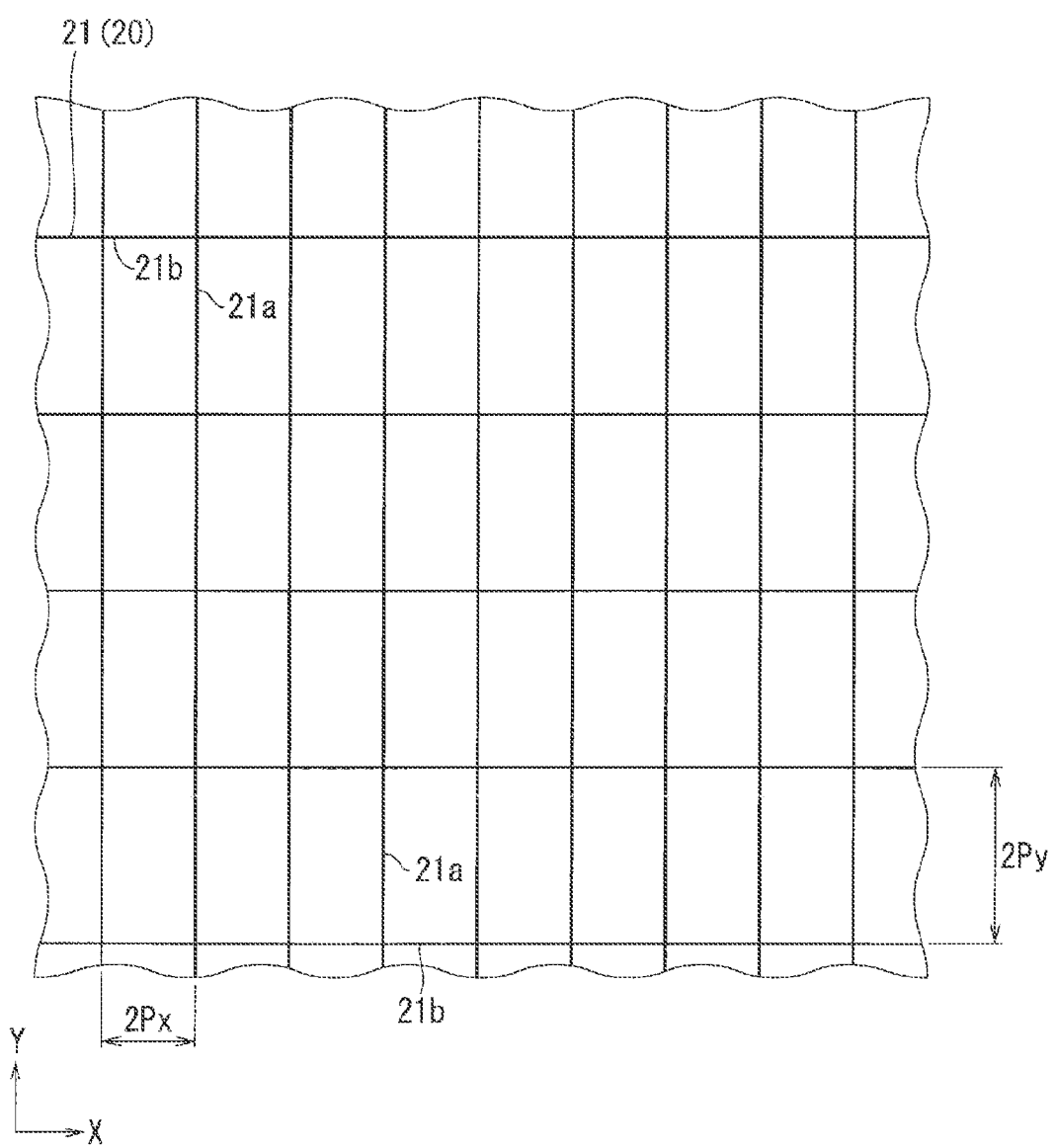
FIG. 16 is a plan view showing an example of a lower electrode of a touch screen according to a third preferred embodiment.
Figure 17:
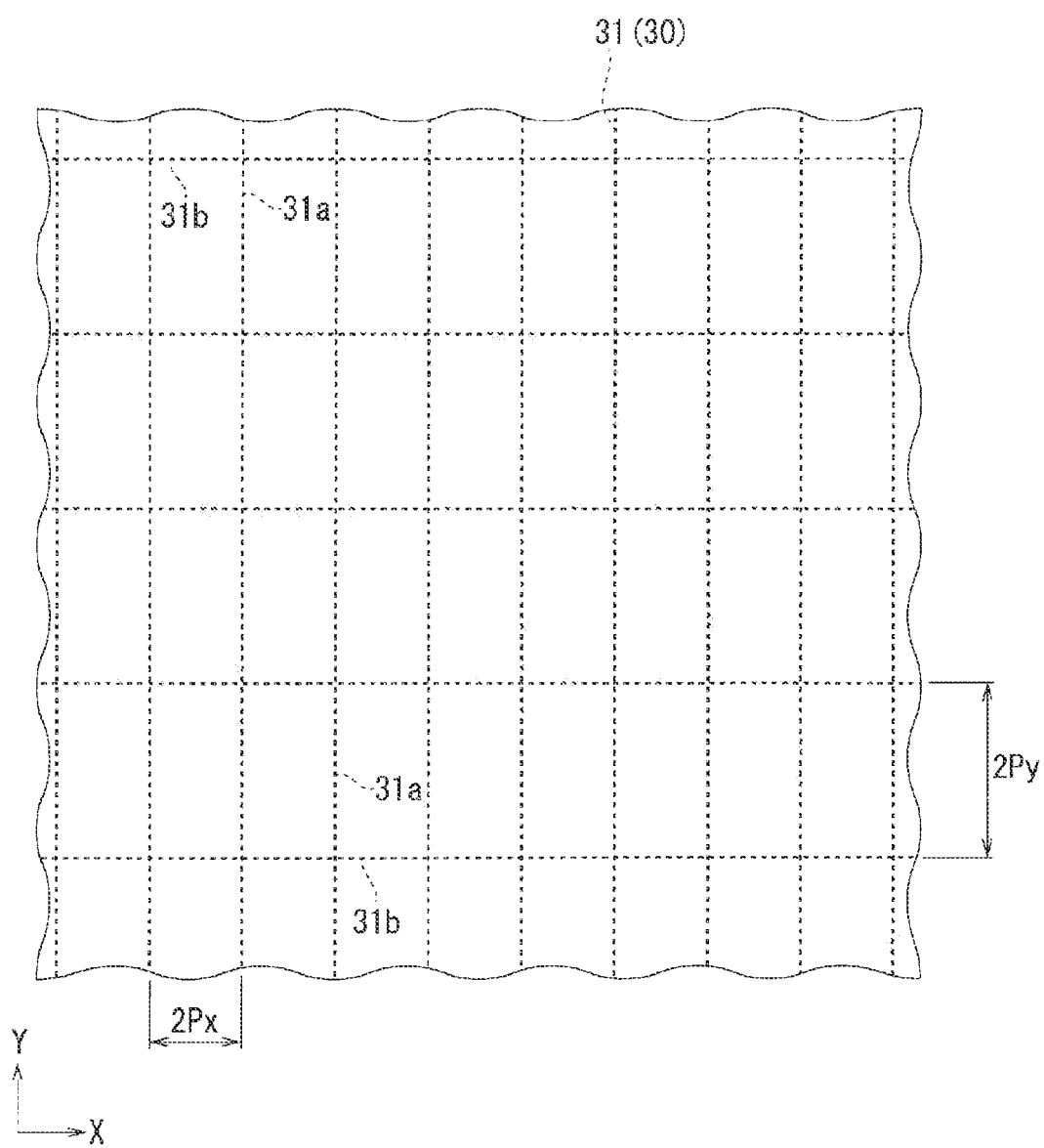
FIG. 17 is a plan view showing an example of an upper electrode of the touch screen according to the third preferred embodiment.
Figure 18:
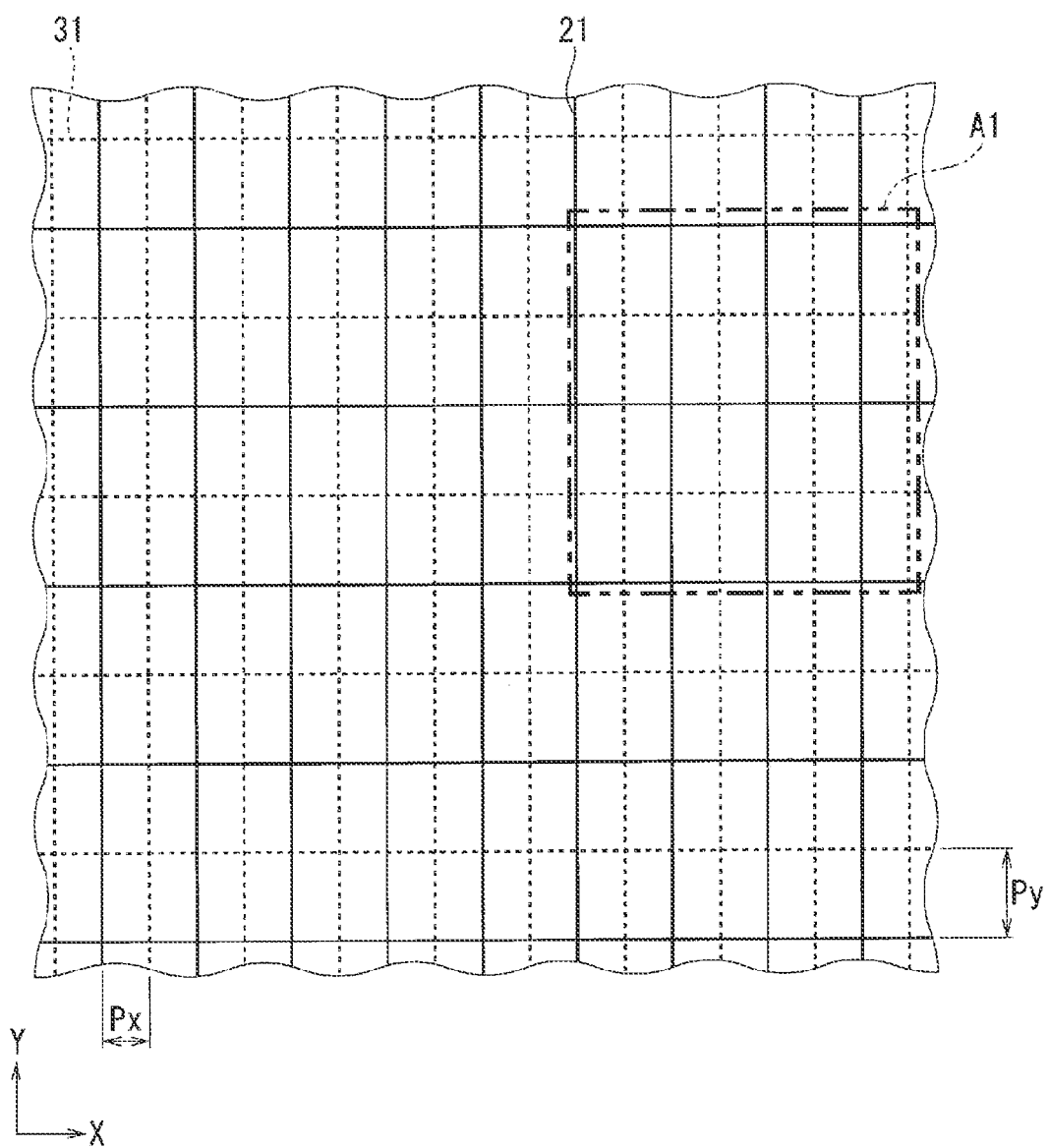
FIG. 18 is a plan view showing an example of the lower electrode and the upper electrode of the touch screen according to the third preferred embodiment.
Figure 19:
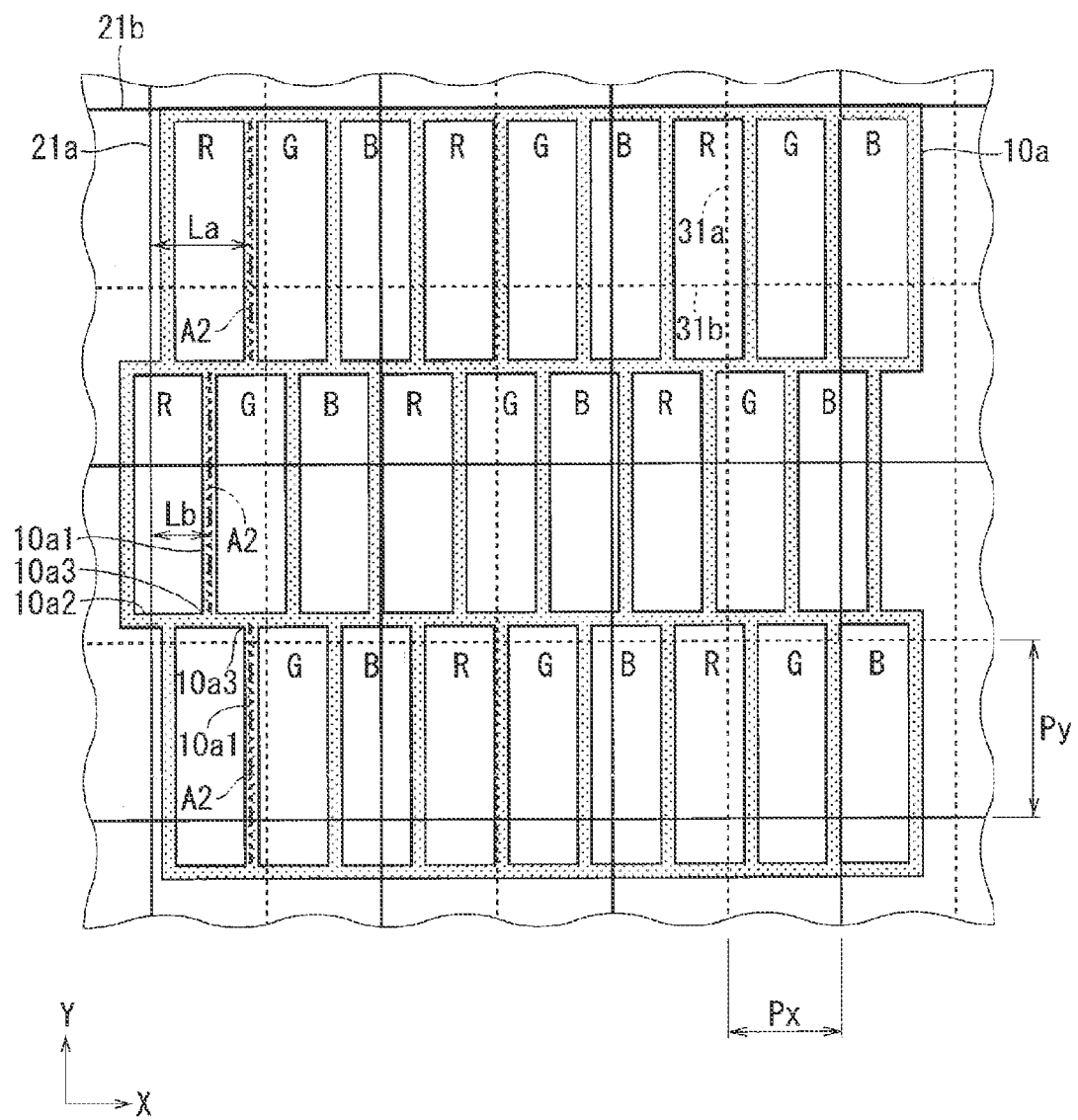
FIG. 19 is an enlarged plan view showing an example of a region A1 according to the third preferred embodiment.

With reference to FIGS. 16 to 19, detailed structures of the row-direction wires 21 and the column-direction wires 31 are described. FIG. 16 is an enlarged plan view of a lower electrode 20 around a region in which the row-direction wires 21 and the column-direction wires 31 overlap each other in plan view. FIG. 17 is an enlarged plan view of an upper electrode 30 around a region in which the row-direction wires 21 and the column-direction wires 31 overlap each other in plan view. FIG. 18 is a plan view of the region in which the row-direction wires 21 and the column-direction wires 31 overlap each other in plan view. FIG. 19 is an enlarged view of a region A1 in FIG. 18. In FIGS. 16 to 19, an X direction (horizontal direction) is the row direction, and a Y direction (vertical direction) is the column direction. FIGS. 16 to 19 schematically show wiring patterns, so that wiring has a thickness and an interval different from actual dimensions. A polarization axis (polarization direction) by a polarizing plate 13 is assumed to be parallel to the column direction (Y direction).

As shown in FIG. 16, the row-direction wires 21 forming the lower electrode 20 are each formed of wires in a mesh pattern. The wires in the mesh pattern only include a plurality of conductor wires extending in a parallel direction or a perpendicular direction to the polarization direction by the polarizing plate 13. In other words, each of the row-direction wires 21 only includes a plurality of column partial wires for row (first partial wires) 21a extending in the column direction and a plurality of row partial wires for row (second partial wires) 21b extending in the row direction. Each of the column partial wires for row 21a continues to linearly extend in the column direction, and each of the row partial wires for row 21b continues to linearly extend in the row direction.

Two or more column partial wires for row 21a are arranged at a predetermined interval (2Px) in the row direction. Two or more row partial wires for row 21b are arranged at a predetermined interval (2Py) in the column direction.

As indicated by broken lines in FIG. 17, the column-direction wires 31 forming the upper electrode 30 are each formed of wires in the mesh pattern. The wires in the mesh pattern only include a plurality of conductor wires extending in the parallel direction or the perpendicular direction to the polarization direction by the polarizing plate 13. In other words, each of the column-direction wires 31 only includes a plurality of column partial wires for column (third partial wires) 31a extending in the column direction and a plurality of row partial wires for column (fourth partial wires) 31b extending in the row direction. Each of the column partial wires for column 31a continues to linearly extend in the column direction, and each of the row partial wires for column 31b continues to linearly extend in the row direction.

Two or more column partial wires for column 31a are arranged at a second interval (2Px) twice as large as a first interval (Px), which is predetermined, in the row direction. Two or more row partial wires for column 31b are arranged at a second interval (2Py) twice as large as a first interval (Py), which is predetermined, in the column direction.

As shown in FIG. 18, first combination wires (wires obtained by combining the column partial wires for row 21a and the column partial wires for column 31a in plan view) are arranged at the above-mentioned first interval (Px) in the row direction. In the third preferred embodiment, the interval between the first combination wires is the same as an interval between the column partial wires for row 21a, which are not combined, of the row-direction wire 21 and an interval between the column partial wires for column 31a, which are not combined, of the column-direction wire 31. With this configuration, external-light reflectance in portions in which the row-direction wires 21 and the column-direction wires 31 intersect each other and external-light reflectance in portions except for the above-mentioned portions can be made uniform, so that the intersection portions can be prevented from being visually identified. In the third preferred embodiment, wires (hereinafter referred to as "second combination wires) obtained by combining the row partial wires for row 21b and the row partial wires for column 31b in plan view are arranged at the above-mentioned first interval (Py) in the column direction. Therefore, the intersection portions can be prevented from being visually identified in the similar manner as described above.

In the third preferred embodiment, the column partial wires for row 21a, the row partial wires for row 21b, the column partial wires for column 31a, and the row partial wires for column 31b each have a width of 3 μm. In the third preferred embodiment, the color filter substrate 10 has a thickness of 0.5 mm, the interval (Px) in the row direction is 100 μm, and the interval (Py) in the column direction is 300 μm. In the third preferred embodiment having the configuration as described above, the row-direction wires 21 and the column-direction wires 31 are wires forming the mesh pattern, which allows a wider detectable area to be covered with a smaller wiring area. It should be noted that a conductor width and a mesh interval of the row-direction wires 21 and the column-direction wires 31 may be different values from those in the third preferred embodiment according to the use of the touch screen 1.

FIG. 19 is an enlarged view of a region A1 in FIG. 18. Similarly to the first preferred embodiment, a black matrix 10a indicated by a hatch pattern in FIG. 19 has a plurality of first component portions 10a1 and a plurality of second component portions 10a2 that are connected to each other at a plurality of lattice points 10a3. The black matrix 10a has openings (corresponding to sub-pixels) having a rectangular shape whose long sides extend in the column direction. R, G, and B cyclically indicated in FIG. 19 represent red, green, and blue sub-pixels, respectively.

In the third preferred embodiment similar to the first preferred embodiment, a plurality of first lattice passing line segments A2 are defined. Ones of two or more column partial wires for row 21a and two or more first lattice passing line segments A2 are arranged in straight lines extending in the column direction, and the other ones are arranged along the column direction and located at unequal distances from the ones. It should be noted that the third preferred embodiment is different from the first preferred embodiment in that two or more column partial wires for row 21a are arranged in the straight lines extending in the column direction while two or more first lattice passing line segments A2 are arranged in a staggered manner along the column direction. As a result, distances La, Lb (La≠Lb) are unequal between the first lattice passing line segment A2 and the column partial wire for row 21a. Similarly, two or more column partial wires for column 31a are arranged in the straight lines extending in the column direction, and distances are unequal between the first lattice passing line segment A2 and the column partial wire for column 31a.

Conclusions of Third Preferred Embodiment

In the touch screen 1 according to the third preferred embodiment as described above, ones of two or more column partial wires for row 21a and two or more first lattice passing line segments A2 are arranged in the straight lines extending in the column direction while the other ones are arranged along the column direction and located at the unequal distances from the ones in the similar manner as the first preferred embodiment. Therefore, portions having regular intervals between the column partial wires for row 21a and the black matrix 10a can be shortened, so that interference of light can be suppressed, which can suppress occurrence of moiré. The column partial wires for column 31a are also arranged similarly to the column partial wires for row 21a, so that the occurrence of moiré can be suppressed in the similar manner as described above.

The touch screen 1 according to the third preferred embodiment and the touch screen according to the first preferred embodiment are selectively mounted on the liquid crystal display to confirm a contrast ratio and visibility of moiré. As a result, the touch screen 1 according to the third preferred embodiment and the touch screen according to the first preferred embodiment have almost the same contrast ratio and the same visibility of the moiré.

The row-direction wires 21 and the column-direction wires 31 are disposed in the parallel direction and the perpendicular direction to the polarization axis by the polarizing plate 13, and the wires are prevented from being disposed at regular distances from the first lattice passing line segments A2 extending in the column direction. This can therefore suppress light leakage when the liquid crystal display displays black to the same level of light leakage in the touch screen 1 according to the first preferred embodiment. Moreover, moiré (interference of light) caused by the row-direction wires 21, the column-direction wires 31, and the black matrix 10a can be suppressed to the same level of moiré in the touch screen 1 according to the first preferred embodiment. Therefore, even when the row-direction wires 21 and the column-direction wires 31 overlap each other in plan view above the polarizing plate 13 on the display surface side, a touch screen in which the moiré is hardly visually identified can be achieved without lowering the contrast ratio.

Modifications of Third Preferred Embodiment

Transparent conductive materials such as ITO and graphene or metal materials such as aluminum, chromium, copper, and silver may be used as materials for the row-direction wires 21 and the column-direction wires 31. Alternatively, the row-direction wires 21 and the column-direction wires 31 may be made of an alloy of aluminum, chromium, copper, and silver, or may have a multilayer structure in which aluminum nitride is formed on the alloy. The row-direction wires 21 and the column-direction wires 31 may be made of materials different from those in the third preferred embodiment according to the use of the touch screen 1.

In the third preferred embodiment, the openings (corresponding to the sub-pixels) of the black matrix 10a each have the rectangular shape formed by the sides extending in the row direction and the column direction, but the shape is not limited to this.

Figure 20:
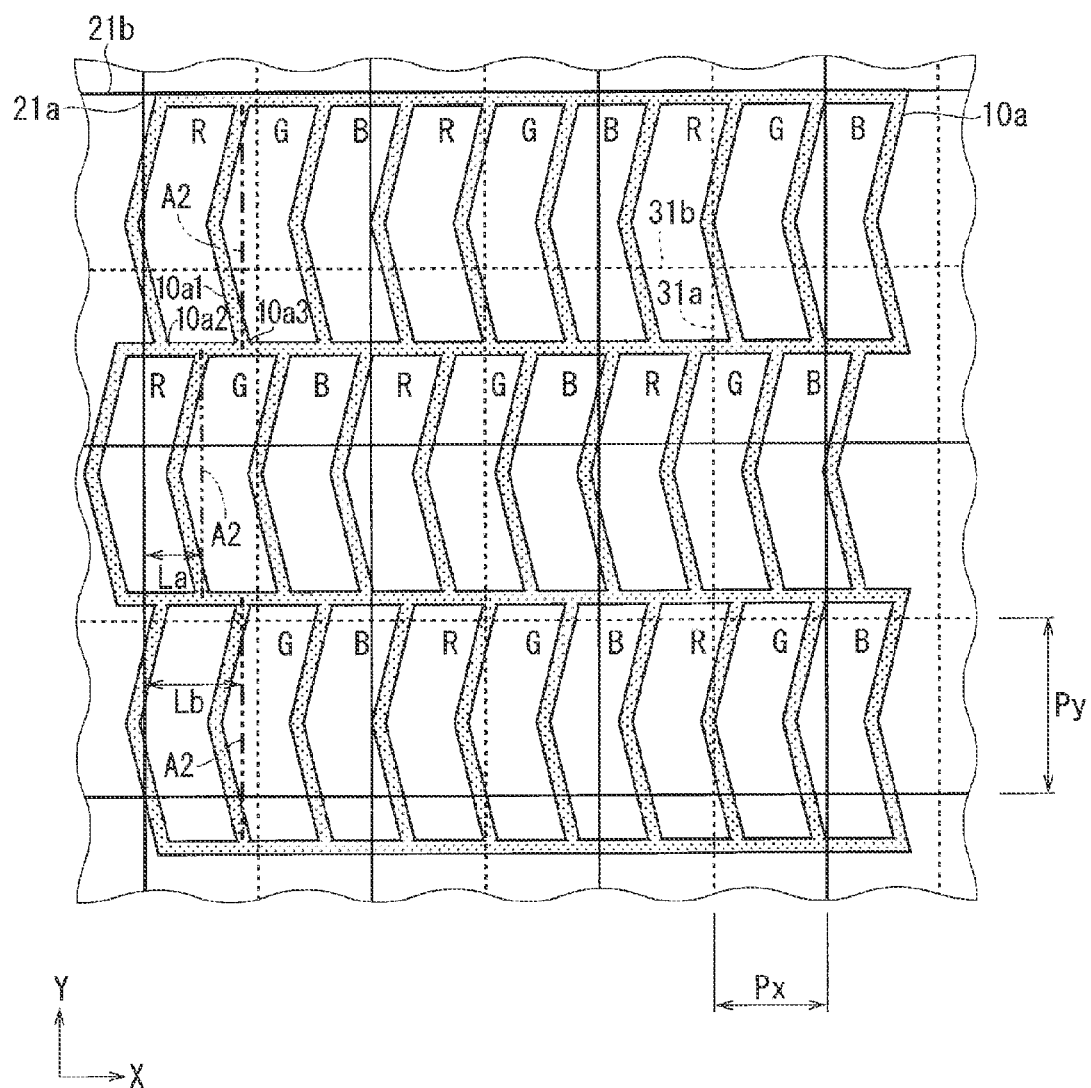
FIG. 20 is an enlarged plan view showing an example of a region A1 according to a modification.

For example, as shown in FIG. 20, the openings (corresponding to the sub-pixels) of the black matrix 10a may each have such a shape that the two long sides of the above-mentioned rectangle are replaced with sides of a V-shape. In other words, the first component portion 10a1 of the black matrix 10a may be formed of a component that combines a component extending in the column direction and a component extending in the row direction. The second component portion 10a2 of the black matrix 10a may be formed of a component that combines a component extending in the column direction and a component extending in the row direction, but it is not shown. In any of the cases, any of the distances between the first lattice passing line segment A2 and the column partial wire for row 21a and the distances between the first lattice passing line segment A2 and the column partial wire for column 31a are unequal. Therefore, the occurrence of moiré can be suppressed in the similar manner as described above.

Figure 21:
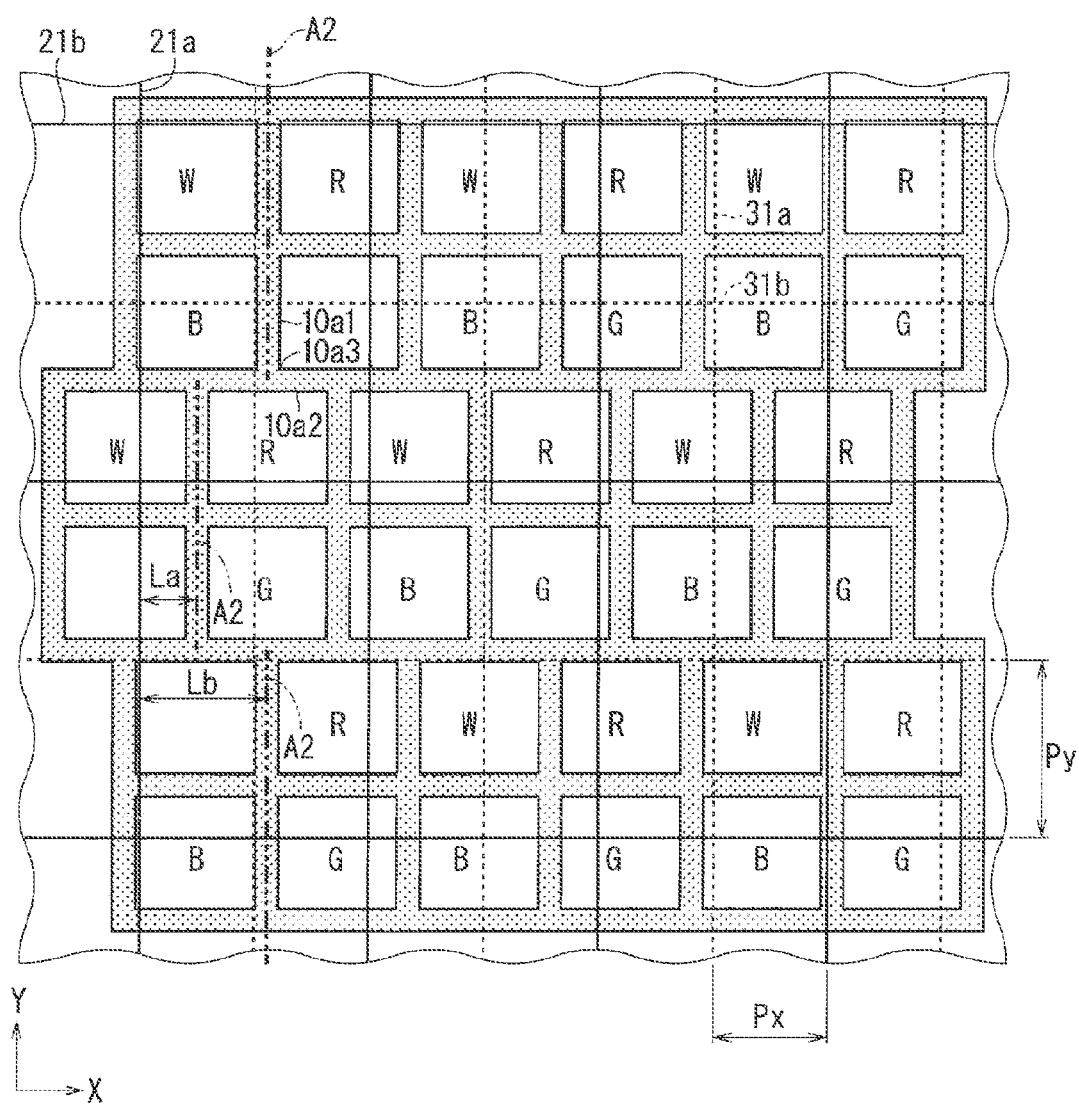
FIG. 21 is an enlarged plan view showing another example of the region A1 according to the modification.

For example, as shown in FIG. 21, the openings (corresponding to the sub-pixels) of the black matrix 10a may each have a square shape in which a pair of opposite sides extend in the column direction. Also in this case, any of the distances between the first lattice passing line segment A2 and the column partial wire for row 21a and the distances between the first lattice passing line segment A2 and the column partial wire for column 31a are unequal. Therefore, the occurrence of moiré can be suppressed in the similar manner as described above. W shown in FIG. 21 represents white sub-pixels.

As the third preferred embodiment, an excellent example is shown in which the column partial wires for row 21a, the row partial wires for row 21b, and the column partial wires for column 31a, and the row partial wires for column 31b are each arranged at regular intervals, but they may not be arranged at regular intervals.

Fourth Preferred Embodiment

In the first to third preferred embodiments, the configuration in which the openings (corresponding to the sub-pixels) of the black matrix 10a have the long sides extending in the column direction is described. In contrast, openings of a black matrix 10a have long sides extending in the row direction instead of the column direction in a fourth preferred embodiment of the present invention. The fourth preferred embodiment having such a configuration can also have the same effects of suppressing the moiré in the similar manner as described above. In addition, a cross-sectional structure of a touch screen 1 and a structure of lead-out wires are similar to the structures shown in FIGS. 1 and 2 of the first preferred embodiment, and thus the descriptions are omitted.

Figure 22:
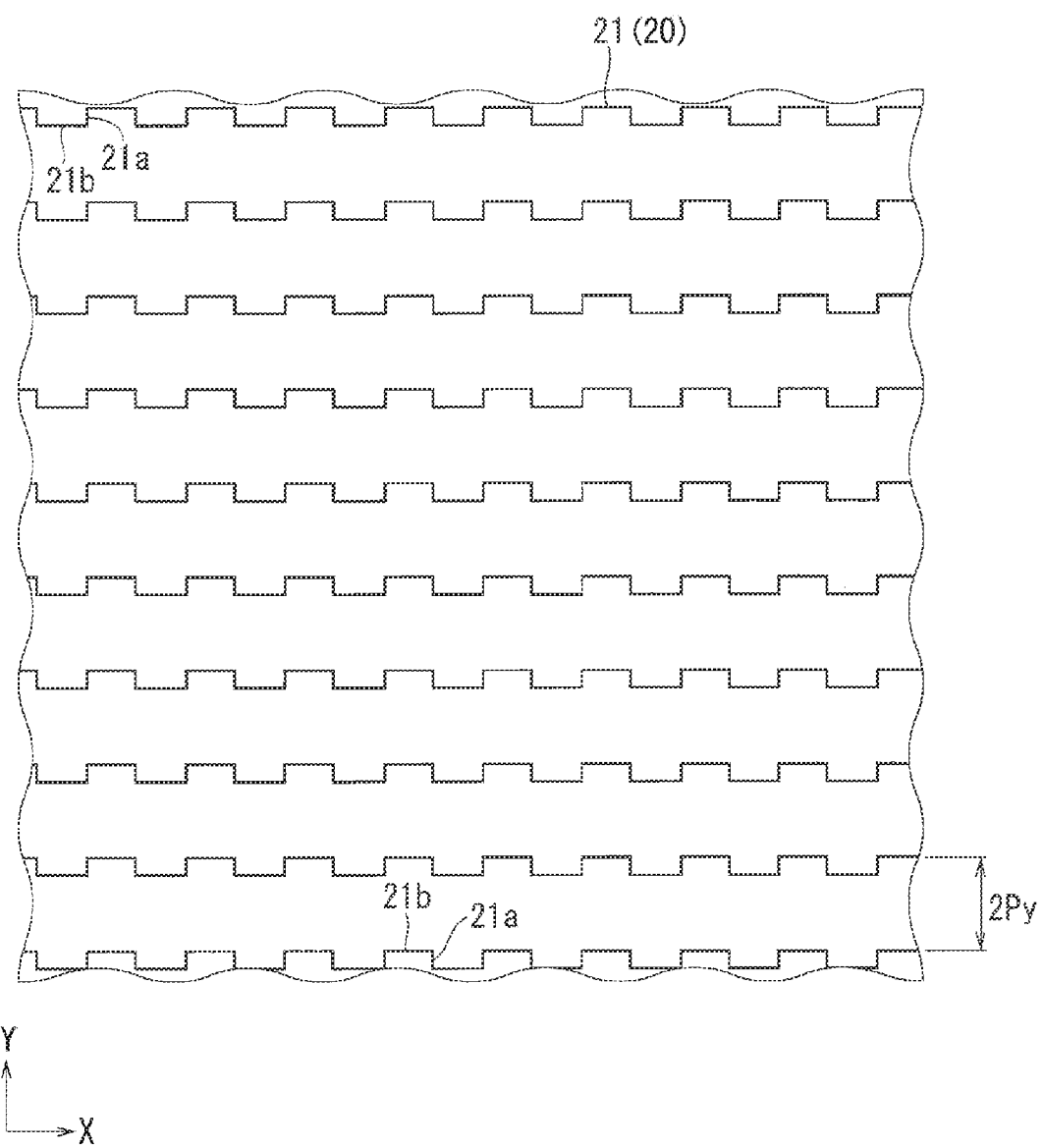
FIG. 22 is a plan view showing an example of a lower electrode of a touch screen according to a fourth preferred embodiment.
Figure 23:
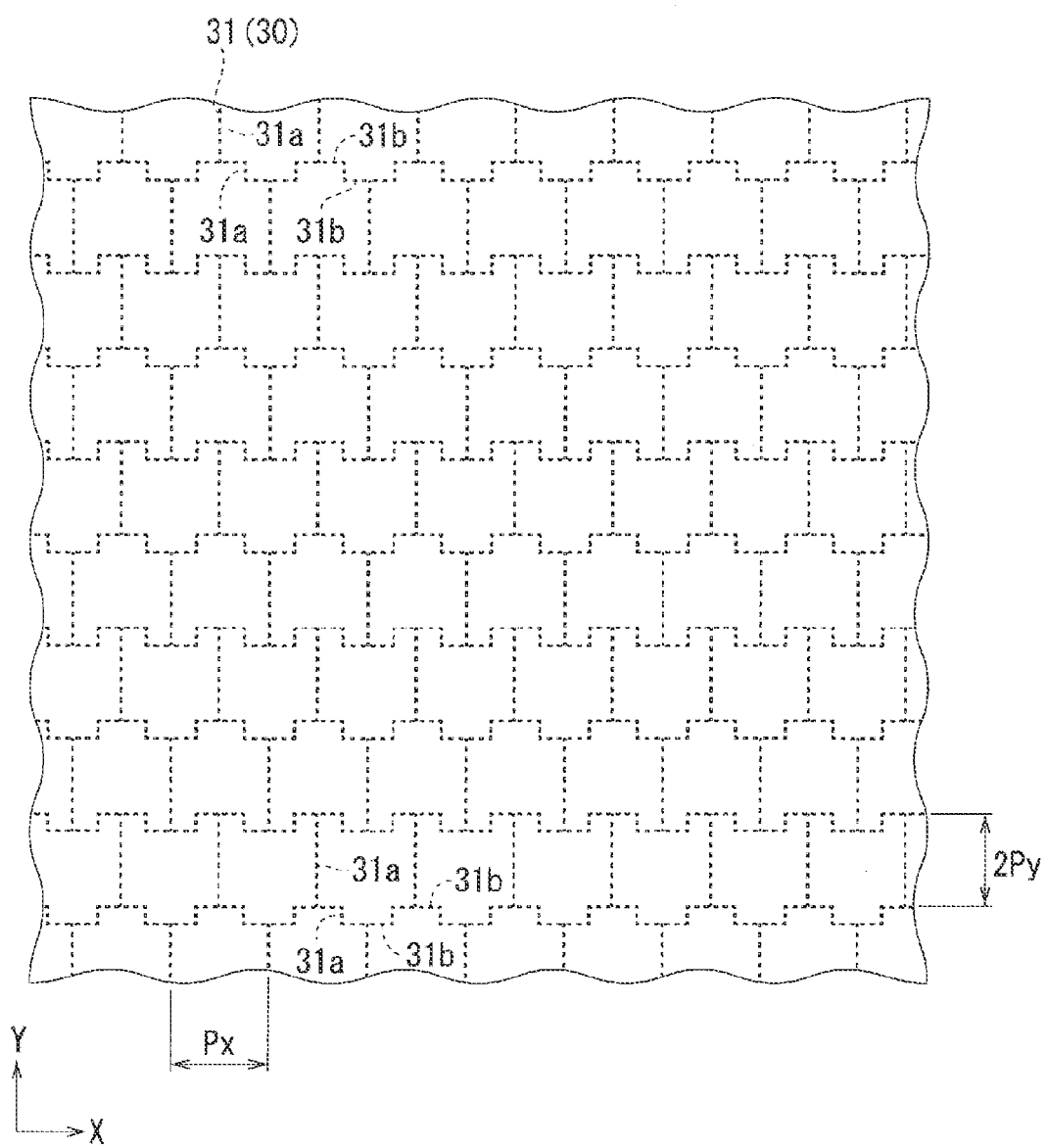
FIG. 23 is a plan view showing an example of an upper electrode of the touch screen according to the fourth preferred embodiment.
Figure 25:
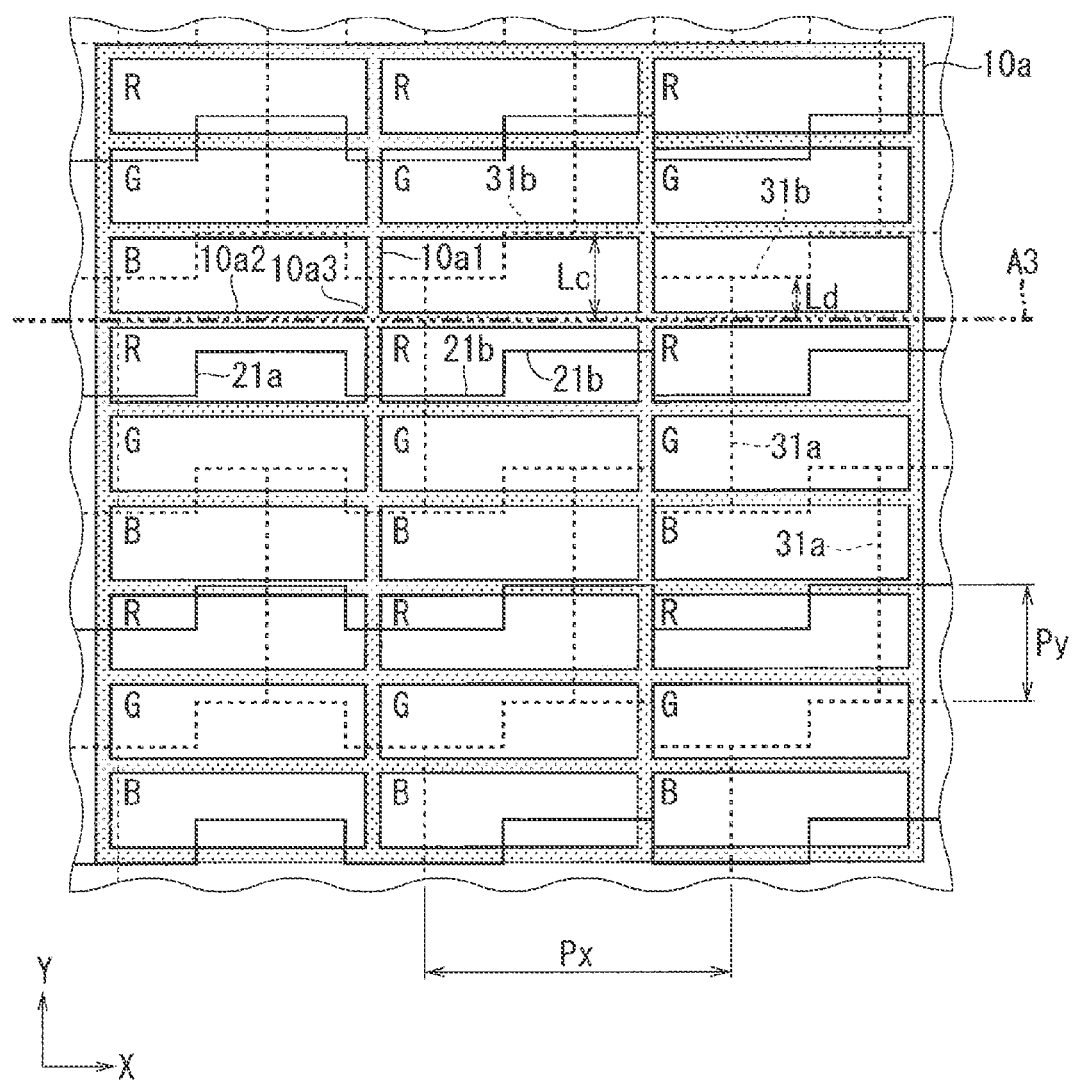
FIG. 25 is an enlarged plan view showing an example of a region A1 according to the fourth preferred embodiment.

With reference to FIGS. 22 to 25, detailed structures of row-direction wires 21 and column-direction wires 31 are described. FIG. 22 is an enlarged plan view of a lower electrode 20 around a region in which the row-direction wires 21 and the column-direction wires 31 overlap each other in plan view. FIG. 23 is an enlarged plan view of an upper electrode 30 around a region in which the row-direction wires 21 and the column-direction wires 31 overlap each other in plan view. FIG. 24 is the plan view of a region in which the row-direction wires 21 and the column-direction wires 31 overlap each other in plan view. FIG. 25 is an enlarged view of a region A1 in FIG. 24. In FIGS. 22 to 25, an X direction (horizontal direction) is the row direction, and a Y direction (vertical direction) is the column direction. FIGS. 22 to 25 schematically show wiring patterns, so that wiring has a thickness and an interval different from actual dimensions. A polarization axis (polarization direction) by a polarizing plate 13 is assumed to be parallel to the column direction (Y direction).

As shown in FIG. 22, the row-direction wires 21 forming the lower electrode 20 are each formed of zigzag wires. The zigzag wires only include a plurality of conductor wires extending in a parallel direction or a perpendicular direction to the polarization direction by the polarizing plate 13. In other words, each of the row-direction wires 21 only includes a plurality of column partial wires for row (first partial wires) 21a extending in the column direction and a plurality of row partial wires for row (second partial wires) 21b extending in the row direction. The column partial wires for row 21a and the row partial wires for row 21b are connected to each other while forming a right angle at a bent portion. Each of the column partial wires for row 21a does not continue to linearly extend in the column direction, and each of the row partial wires for row 21b does not continue to linearly extend in the row direction.

Two or more row partial wires for row 21b are arranged at a predetermined interval (2Py) in the column direction.

As indicated by broken lines in FIG. 23, the column-direction wires 31 forming the upper electrode 30 are each formed of wires in the mesh pattern. The wires in the mesh pattern only include a plurality of conductor wires extending in the parallel direction or the perpendicular direction to the polarization direction by the polarizing plate 13. In other words, each of the column-direction wires 31 only includes a plurality of column partial wires for column (third partial wires) 31a extending in the column direction and a plurality of row partial wires for column (fourth partial wires) 31b extending in the row direction. The column partial wires for column 31a and the row partial wires for column 31b are connected to each other while forming a right angle at a bent portion. Each of the column partial wires for column 31a does not continue to linearly extend in the column direction, and each of the row partial wires for column 31b does not continue to linearly extend in the row direction.

Two or more row partial wires for column 31b are arranged at a second interval (2Py) twice as large as a first interval (Py), which is predetermined, in the column direction. The column partial wires for column 31a connecting the row partial wires for column 31b have the same length as the interval (2Py). Two or more column partial wires for column 31a are arranged at a predetermined interval (Px) in the row direction.

As shown in FIG. 24, the second combination wires (wires obtained by combining the row partial wires for row 21b and the row partial wires for column 31b in plan view) are arranged at the above-mentioned first interval (Py) in the column direction. In the fourth preferred embodiment, the interval between the second combination wires is the same as an interval between the row partial wires for row 21b, which are not combined, of the row-direction wire 21 and an interval between the row partial wires for column 31b, which are not combined, of the column-direction wire 31. With this configuration, external-light reflectance in portions in which the row-direction wires 21 and the column-direction wires 31 intersect each other and external-light reflectance in portions except for the above-mentioned portions can be made uniform, so that the intersection portions can be prevented from being visually identified.

In the fourth preferred embodiment, the column partial wires for row 21a, the row partial wires for row 21b, the column partial wires for column 31a, and the row partial wires for column 31b each have a width of 3 μm. In the fourth preferred embodiment, the color filter substrate has a thickness of 0.5 mm, the interval (Px) in the row direction is 300 μm, and the interval (Py) in the column direction is 100 μm. In the fourth preferred embodiment having the configuration as described above, the row-direction wires 21 and the column-direction wires 31 are wires forming the mesh pattern, which allows a wider detectable area to be covered with a smaller wiring area. It should be noted that a conductor width and a mesh interval of the row-direction wires 21 and the column-direction wires 31 may be different values from those in the fourth preferred embodiment according to the use of the touch screen 1.

FIG. 25 is an enlarged view of a region A1 in FIG. 24. Similarly to the first preferred embodiment, a black matrix 10a indicated by a hatch pattern in FIG. 25 has a plurality of first component portions 10a1 and a plurality of second component portions 10a2 that are connected to each other at a plurality of lattice points 10a3. The black matrix 10a has openings (corresponding to sub-pixels) having a rectangular shape whose long sides extend in the row direction. R, G, and B cyclically indicated in FIG. 25 represent red, green, and blue sub-pixels, respectively.

In the fourth preferred embodiment similar to the first preferred embodiment, a plurality of first lattice passing line segments A2 and a plurality of second lattice passing line segments A3 are defined (FIG. 25 does not show the first lattice passing line segments A2). Ones of two or more row partial wires for column 31b and two or more second lattice passing line segments A3 are arranged in straight lines extending in the row direction, and the other ones are arranged along the row direction and located at unequal distances from the ones. In the fourth preferred embodiment, two or more second lattice passing line segments A3 are arranged in the straight lines extending in the row direction, and two or more row partial wires for column 31b are arranged in a staggered manner along the row direction. As a result, distances Lc, Ld (Lc≠Ld) are unequal between the second lattice passing line segment A3 and the row partial wire for column 31b. Similarly, two or more row partial wires for row 21b are arranged in the staggered manner along the row direction, and distances are unequal between the first lattice passing line segment A2 and the row partial wire for row 21b.

Ones of two or more column partial wires for column 31a and two or more first lattice passing line segments A2, which are not shown, are arranged in straight lines extending in the column direction, and the other ones are arranged along the column direction and located at unequal distances from the ones. In the fourth preferred embodiment, two or more first lattice passing line segments A2 are arranged in the straight lines extending in the column direction, and two or more column partial wires for column 31a are arranged in a staggered manner along the column direction. As a result, distances are unequal between the first lattice passing line segment A2 and the column partial wire for column 31a.

Conclusions of Fourth Preferred Embodiment

In the touch screen 1 according to the fourth preferred embodiment as described above, ones of two or more row partial wires for column 31b and two or more second lattice passing line segments A3 are arranged in the straight lines extending in the row direction while the other ones are arranged along the row direction and located at the unequal distances from the ones. Therefore, portions having regular intervals between the row partial wires for column 31b and the black matrix 10a can be shortened, so that interference of light can be suppressed, which can suppress occurrence of moiré. The row partial wires for row 21b and the column partial wires for column 31a are also arranged similarly to the row partial wires for column 31b, so that the occurrence of moiré can be suppressed in the similar manner as described above.

The touch screen 1 according to the fourth preferred embodiment and the touch screen according to the first preferred embodiment are selectively mounted on the liquid crystal display to confirm a contrast ratio and visibility of moiré. As a result, the touch screen 1 according to the fourth preferred embodiment and the touch screen according to the first preferred embodiment have almost the same contrast ratio and the same visibility of the moiré.

The row-direction wires 21 and the column-direction wires 31 are disposed in the parallel direction and the perpendicular direction to the polarization axis by the polarizing plate 13, and the wires are prevented from being disposed at regular distances from the second lattice passing line segments A3 extending in the row direction. This can therefore suppress light leakage when the liquid crystal display displays black to the same level of light leakage in the touch screen 1 according to the first preferred embodiment. Moreover, moiré (interference of light) caused by the row-direction wires 21, the column-direction wires 31, and the black matrix 10a can be suppressed to the same level of moiré in the touch screen 1 according to the first preferred embodiment. Therefore, even when the row-direction wires 21 and the column-direction wires 31 overlap each other in plan view above the polarizing plate 13 on the display surface side, a touch screen in which the moiré is hardly visually identified can be achieved without lowering the contrast ratio.

Modifications of Fourth Preferred Embodiment

Transparent conductive materials such as ITO and graphene or metal materials such as aluminum, chromium, copper, and silver may be used as materials for the row-direction wires 21 and the column-direction wires 31. Alternatively, the row-direction wires 21 and the column-direction wires 31 may be made of an alloy of aluminum, chromium, copper, and silver, or may have a multilayer structure in which aluminum nitride is formed on the alloy. The row-direction wires 21 and the column-direction wires 31 may be made of materials different from those in the fourth preferred embodiment according to the use of the touch screen 1.

In the fourth preferred embodiment, the openings (corresponding to the sub-pixels) of the black matrix 10a have the rectangular shape formed by the sides extending in the row direction and the column direction, but the shape is not limited to this. For example, the openings (corresponding to the sub-pixels) of the black matrix 10a may each have such a shape that the two long sides of the above-mentioned rectangle are replaced with sides of a V-shape in the similar manner as the modification described above. For example, the openings (corresponding to the sub-pixels) of the black matrix 10a may each have a square shape in which a pair of opposite sides extend in the column direction similarly to the modification described above. Also in these cases, the occurrence of moiré can be suppressed in the similar manner as described above.

As the fourth preferred embodiment, an excellent example is shown in which the row partial wires for row 21b, the column partial wires for column 31a, and the row partial wires for column 31b are each arranged at regular intervals, but they may not be arranged at regular intervals.

The fourth preferred embodiment corresponds to a configuration in which the zigzag wiring pattern shown in the first preferred embodiment is rotated 90 degrees. In view of this, the fourth preferred embodiment may have a configuration in which the checkered wiring pattern shown in the second preferred embodiment is rotated 90 degrees.

Modifications of First to Fourth Preferred Embodiments

A transparent substrate for forming a touch screen instead of the color filter substrate 10 may be used in the configuration (FIG. 1) of the first to fourth preferred embodiments described above. FIG. 26 is a perspective view showing a layer structure of a touch screen 1. In the example of FIG. 26, a lower electrode 20, an interlayer insulating film 11, an upper electrode 30, and a protective film 12 are formed on an upper surface (lower surface in FIG. 26) of a transparent substrate 15 in the stated order. A polarizing plate 13 is bonded to a lower surface (upper surface in FIG. 26) of the transparent substrate 15. The touch screen 1 is mounted on a display element 51 as shown in FIG. 1 with the polarizing plate 13 on a display surface side.

With this configuration, a distance between the touch screen 1 and the display element 51 is increased by only a thickness of the adhesive bonding the touch screen 1 and the display element 51. Thus, an influence of electromagnetic noise emitted from the display element 51 can be reduced.

Fifth Preferred Embodiment

Hereinafter, a touch screen 1 according to a fifth preferred embodiment of the present invention is described. In the following description, the touch screen 1 according to the fifth preferred embodiment is assumed to be a projected capacitive touch screen, but the touch screen 1 is not limited to this.

FIG. 27 is a perspective view showing a layer structure of the touch screen 1 according to the fifth preferred embodiment. The touch screen 1 includes a color filter substrate 10 that is a substrate made of a transparent glass material or transparent resin and that includes a color filter and a black matrix disposed thereon. A lower electrode 20 is formed on a surface, which includes the color filter disposed thereon, of the color filter substrate 10.

An upper electrode 30 is formed on a surface, which is opposite to the surface including the color filter disposed thereon, of the color filter substrate 10. A protective film 12 is formed so as to cover the upper electrode 30. The protective film 12 is an insulating film having translucency such as a silicon nitride film. A polarizing plate 13 used for a display element (such as a liquid crystal display) on which the touch screen 1 is mounted is bonded to an upper surface of the protective film 12. Further, a transparent substrate 14 made of a transparent glass material or transparent resin, for example, is adhering to (mounted on) an upper surface of the polarizing plate 13 to protect the touch screen 1.

The lower electrode 20 includes a plurality of row-direction wires 21 made of a transparent wiring material such as ITO or a metal wiring material such as aluminum. The upper electrode 30 similar to the lower electrode 20 includes a plurality of column-direction wires 31 made of a transparent wiring material such as ITO or a metal wiring material such as aluminum.

In the fifth preferred embodiment having the configuration described above, of the column-direction wires 31 and the row-direction wires 21, the column-direction wires 31 (one wiring) extending in the column direction are disposed between the color filter substrate 10 and the polarizing plate 13 while the row-direction wires 21 (the other wiring) extending in the row direction are disposed opposite to the column-direction wires 31 (one wiring) with respect to the color filter substrate 10. In the fifth preferred embodiment having such a configuration, the lower electrode 20 absorbs electromagnetic noise emitted from the display element 51 in FIG. 1. Thus, the electromagnetic noise received by the upper electrode 30 can be reduced, and sensitivity to detection can be improved.

In the fifth preferred embodiment, the column-direction wires 31 and the row-direction wires 21 described above each have a multilayer structure including an aluminum-based alloy layer and a nitrided aluminum-based alloy layer. This can reduce wiring resistance and increase light transmittance in a detectable area. In the fifth preferred embodiment, the column-direction wires 31 are disposed in the layer above the row-direction wires 21, but the positional relationship may be reversed so that the row-direction wires 21 may be disposed in a layer above the column-direction wires 31. Moreover, the same materials, which are the aluminum-based alloy layer and the nitride aluminum-based alloy layer in the multilayer structure, are used for the column-direction wires 31 and the row-direction wires 21, but these materials may not be the same. For example, the materials for the column-direction wires 31 are the aluminum-based alloy layer and the nitride aluminum-based alloy layer in the multilayer structure while the row-direction wires 21 may be made of a transparent wiring material such as ITO.

A user touches the transparent substrate 14 being a surface of the touch screen 1 with an indicator such as a finger to perform operation. When the indicator touches the transparent substrate 14, capacitive coupling (touch capacitance) occurs between the indicator and at least ones of the row-direction wires 21 and the column-direction wires 31 below the transparent substrate 14. The self-capacitance method detects the touch capacitance to specify a position of the touch of the indicator in the detectable area.

In addition, lead-out wires according to the fifth preferred embodiment are similar to the lead-out wires R1 to R6 and C1 to C8 shown in FIG. 2 in the first preferred embodiment except for the terminal portion of the lower electrode 20, so that the descriptions are omitted. A transfer pad, which is not shown, is formed on each of the lead-out wires R1 to R6. The transfer pad connects, through a transfer, the terminal portion of the lower electrode 20 and signal input wiring for the row-direction wires 21 formed on the display element 51 (for example, a TFT array substrate of a liquid crystal display).

Figure 28:
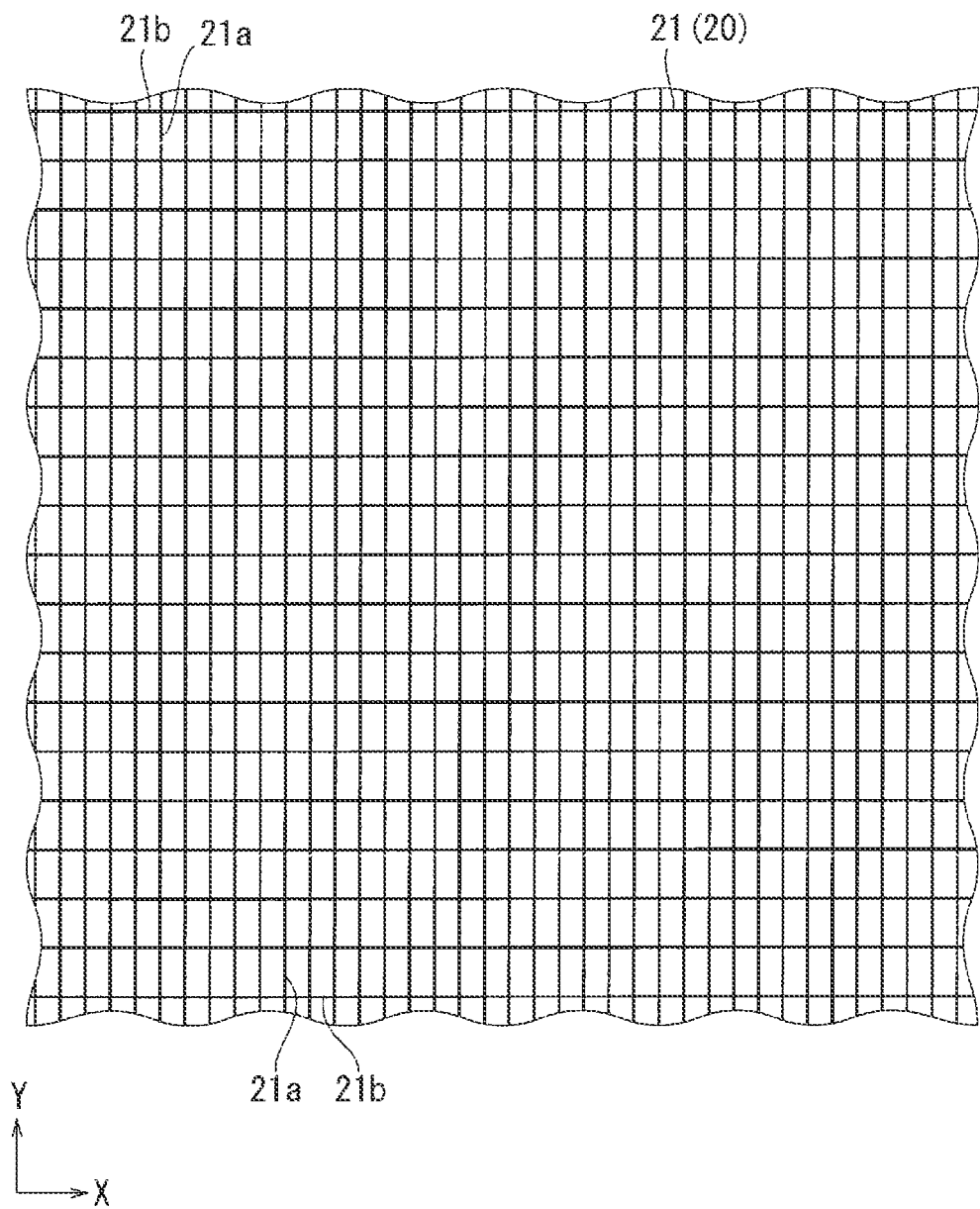
FIG. 28 is a plan view showing an example of a lower electrode of the touch screen according to the fifth preferred embodiment.
Figure 29:
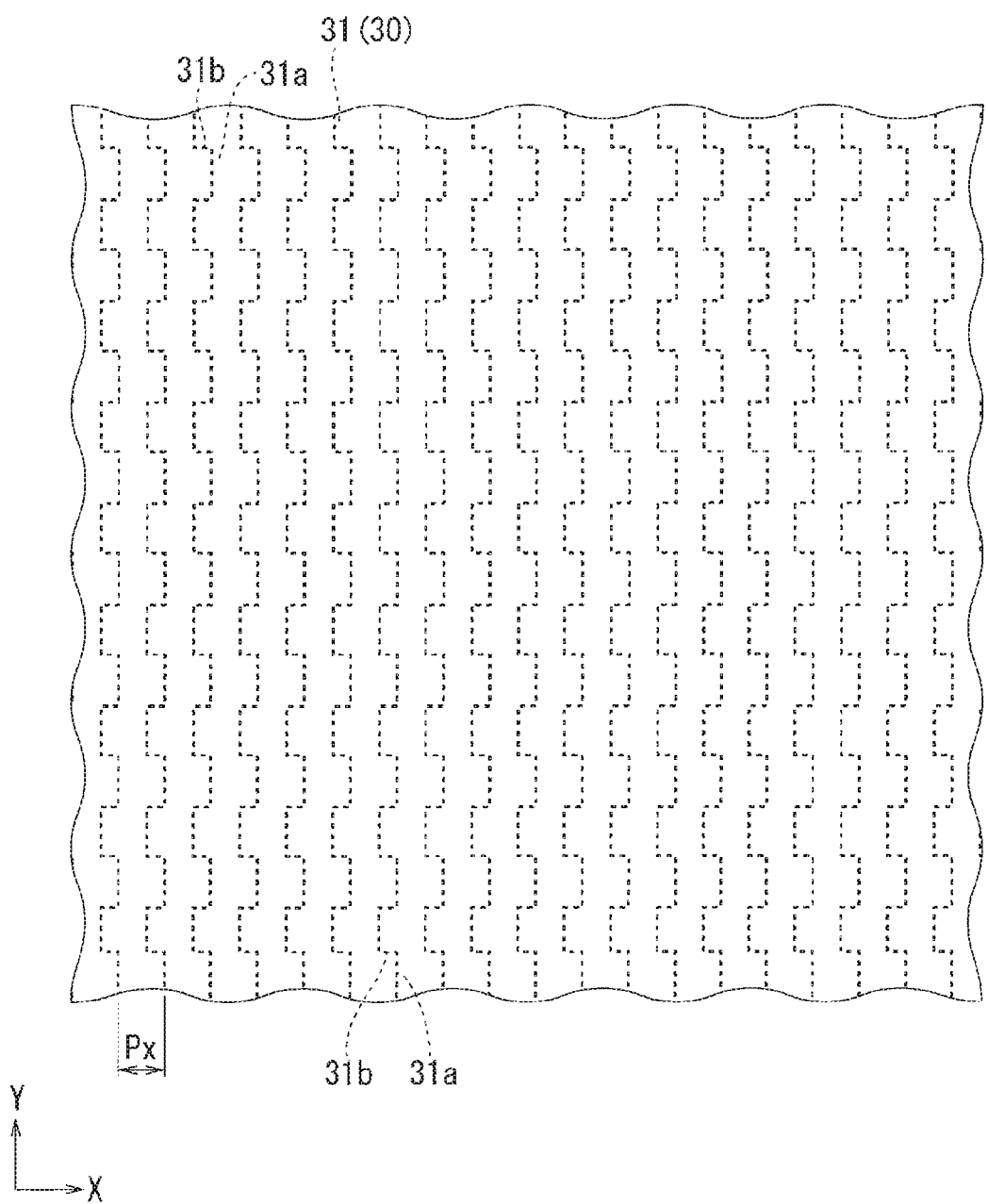
FIG. 29 is a plan view showing an example of an upper electrode of the touch screen according to the fifth preferred embodiment.
Figure 30:
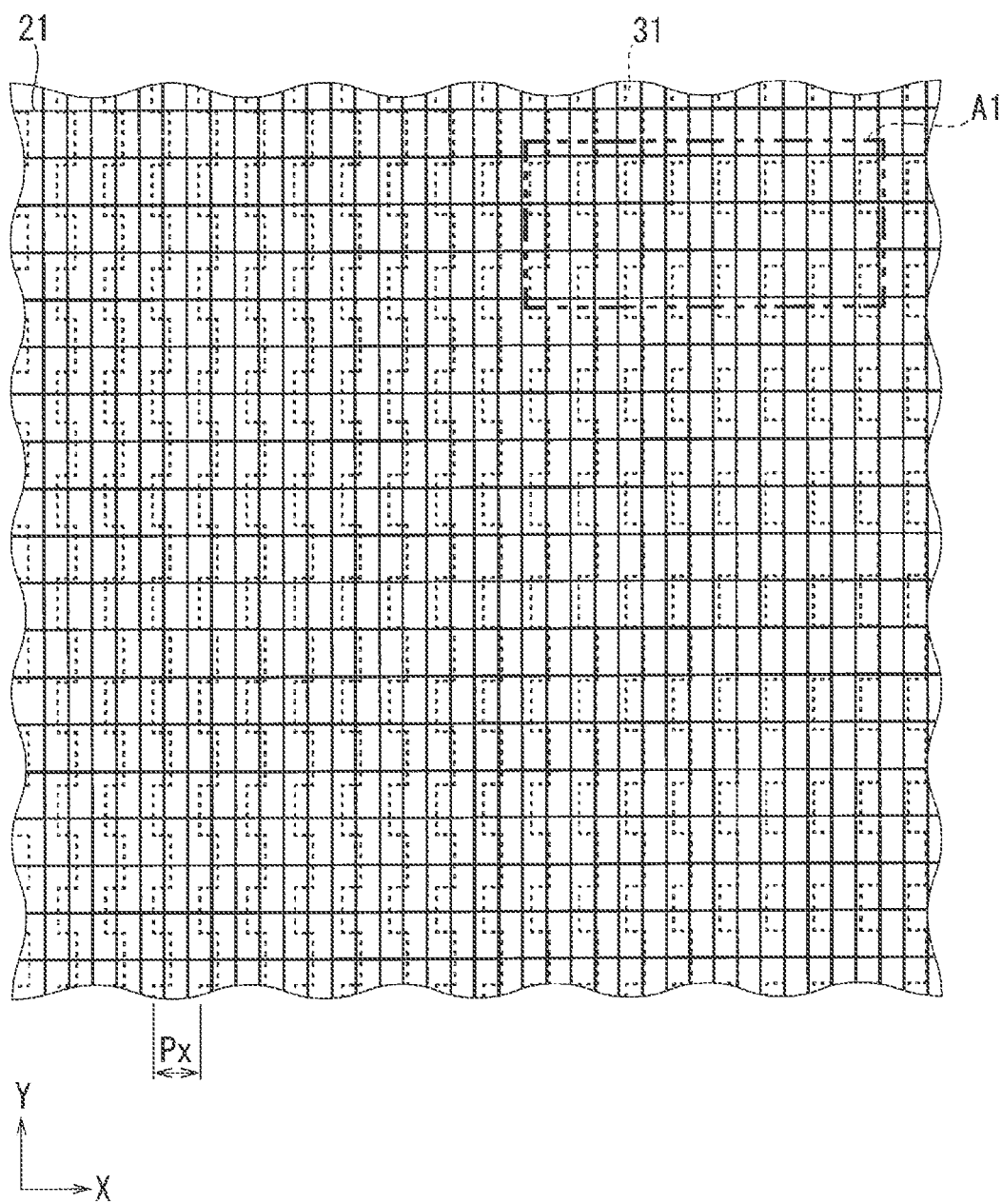
FIG. 30 is a plan view showing an example of the lower electrode and the upper electrode of the touch screen according to the fifth preferred embodiment.

Next, with reference to FIGS. 28 to 31, detailed structures of the row-direction wires 21 and the column-direction wires 31 are described. FIG. 28 is an enlarged plan view of the lower electrode 20 around a region in which the row-direction wires 21 and the column-direction wires 31 overlap each other in plan view. FIG. 29 is an enlarged plan view of the upper electrode 30 around a region in which the row-direction wires 21 and the column-direction wires 31 overlap each other in plan view. FIG. 30 is a plan view of the region in which the row-direction wires 21 and the column-direction wires 31 overlap each other in plan view. FIG. 31 is an enlarged view of a region A1 in FIG. 30. In FIGS. 28 to 31, an X direction (horizontal direction) is the row direction, and a Y direction (vertical direction) is the column direction. FIGS. 28 to 31 schematically show wiring patterns, so that wiring has a thickness and an interval different from actual dimensions. A polarization axis (polarization direction) by the polarizing plate is assumed to be parallel to the column direction (Y direction).

As shown in FIG. 28, the row-direction wires 21 forming the lower electrode 20 are each formed of wires in a mesh pattern. The wires in the mesh pattern only include a plurality of conductor wires extending in a parallel direction or a perpendicular direction to the polarization direction by the polarizing plate 13. In other words, each of the row-direction wires 21 only includes a plurality of column partial wires for row (first partial wires) 21a extending in the column direction and a plurality of row partial wires for row (second partial wires) 21b extending in the row direction. Each of the column partial wires for row 21a continues to linearly extend in the column direction, and each of the row partial wires for row 21b continues to linearly extend in the row direction.

As indicated by broken lines in FIG. 29, the column-direction wires 31 forming the upper electrode 30 are each formed of zigzag wires. The zigzag wires only include a plurality of conductor wires extending in the parallel direction or the perpendicular direction to the polarization direction by the polarizing plate 13. In other words, each of the column-direction wires 31 only includes a plurality of column partial wires for column (third partial wires) 31a extending in the column direction and a plurality of row partial wires for column (fourth partial wires) 31b extending in the row direction. Each of the column partial wires for column 31a does not continue to linearly extend in the column direction, and each of the row partial wires for column 31b does not continue to linearly extend in the row direction.

In the fifth preferred embodiment, the column partial wires for row 21a, the row partial wires for row 21b, the column partial wires for column 31a, and the row partial wires for column 31b each have a width of 3 µm. In the fifth preferred embodiment, the color filter substrate 10 has a thickness of 0.5 mm, and the interval (Px) in the row direction is 100 µm. In the fifth preferred embodiment having the configuration as described above, the row-direction wires 21 and the column-direction wires 31 are wires forming the mesh pattern, which allows a wider detectable area to be covered with a smaller wiring area. It should be noted that a conductor width and a mesh interval of the row-direction wires 21 and the column-direction wires 31 may be different values from those in the fifth preferred embodiment according to the use of the touch screen 1.

As shown in FIG. 30, the row-direction wires 21 and the column-direction wires 31 overlap each other.

FIG. 31 is an enlarged view of a region A1 in FIG. 30. Similarly to the first preferred embodiment, a black matrix 10a indicated by a hatch pattern in FIG. 31 has a plurality of first component portions 10a1 and a plurality of second component portions 10a2 that are connected to each other at a plurality of lattice points 10a3. The black matrix 10a has openings (corresponding to sub-pixels) having a rectangular shape whose long sides extend in the column direction. R, G, and B cyclically indicated in FIG. 31 represent red, green, and blue sub-pixels, respectively.

In the fifth preferred embodiment, the row-direction wires 21 (the other wiring) being the lower electrode 20, namely, the column partial wires for row 21a and the row partial wires for row 21b, are covered with the black matrix 10a in plan view. For example, the row-direction wires 21 are formed so as not to protrude, in plan view, from the black matrix 10a formed on the color filter substrate 10. The lower electrode 20 is disposed in this manner, which can prevent interference between the black matrix 10a and the lower electrode 20 and prevent the occurrence of moiré.

In the fifth preferred embodiment similar to the first preferred embodiment, a plurality of first lattice passing line segments A2 are defined. Ones of two or more column partial wires for column 31a and two or more first lattice passing line segments A2 are arranged in straight lines extending in the column direction, and the other ones are arranged along the column direction and located at unequal distances from the ones. In the fifth preferred embodiment, two or more first lattice passing line segments A2 are arranged in the straight lines extending in the column direction, and two or more column partial wires for column 31a are arranged in a staggered manner along the column direction. As a result, distances La, Lb (La≠Lb) are unequal between the first lattice passing line segment A2 and the column partial wire for column 31a.

Conclusions of Fifth Preferred Embodiment

In the touch screen 1 according to the fifth preferred embodiment as described above, ones of two or more column partial wires for column 31a and two or more first lattice passing line segments A2 are arranged in the straight lines extending in the column direction while the other ones are arranged along the column direction and located at the unequal distances from the ones in the similar manner as the first preferred embodiment. Therefore, portions having regular intervals between the column partial wires for column 31a and the black matrix 10a can be shortened, so that interference of light can be suppressed, which can suppress the occurrence of moiré.

The touch screen 1 according to the fifth preferred embodiment and the related touch screen described in the first preferred embodiment are selectively mounted on the liquid crystal display to confirm a contrast ratio and visibility of moiré. As a result, the touch screen 1 according to the fifth preferred embodiment and the related touch screen have almost the same contrast ratio. On the other hand, moiré having vertical stripes is clearly visually identified in the related touch screen while moiré having a zigzag pattern is slightly visually identified in the touch screen 1 according to the fifth preferred embodiment in which the visibility of the moiré is reduced more than that in the related touch screen.

The row-direction wires 21 and the column-direction wires 31 are disposed in the parallel direction and the perpendicular direction to the polarization axis by the polarizing plate 13, and the wires are prevented from being disposed at regular distances from the first lattice passing line segments A2 extending in the column direction. This can therefore suppress light leakage when the liquid crystal display displays black to the same level of light leakage in the related touch screen. Moreover, moiré (interference of light) caused by the row-direction wires 21, the column-direction wires 31, and the black matrix 10a can be suppressed more than that in the related touch screen. Therefore, even when the row-direction wires 21 and the column-direction wires 31 overlap each other in plan view above the polarizing plate 13 on the display surface side, a touch screen in which the moiré is hardly visually identified can be achieved without lowering the contrast ratio.

Modifications of Fifth Preferred Embodiment

Transparent conductive materials such as ITO and graphene or metal materials such as aluminum, chromium, copper, and silver may be used as materials for the row-direction wires 21 and the column-direction wires 31. Alternatively, the row-direction wires 21 and the column-direction wires 31 may be made of an alloy of aluminum, chromium, copper, and silver, or may have a multilayer structure in which aluminum nitride is formed on the alloy. The row-direction wires 21 and the column-direction wires 31 may be made of materials different from those in the fifth preferred embodiment according to the use of the touch screen 1.

In the fifth preferred embodiment, the openings (corresponding to the sub-pixels) of the black matrix 10a each have the rectangular shape formed by the sides extending in the row direction and the column direction, but the shape is not limited to this.

Figure 32:
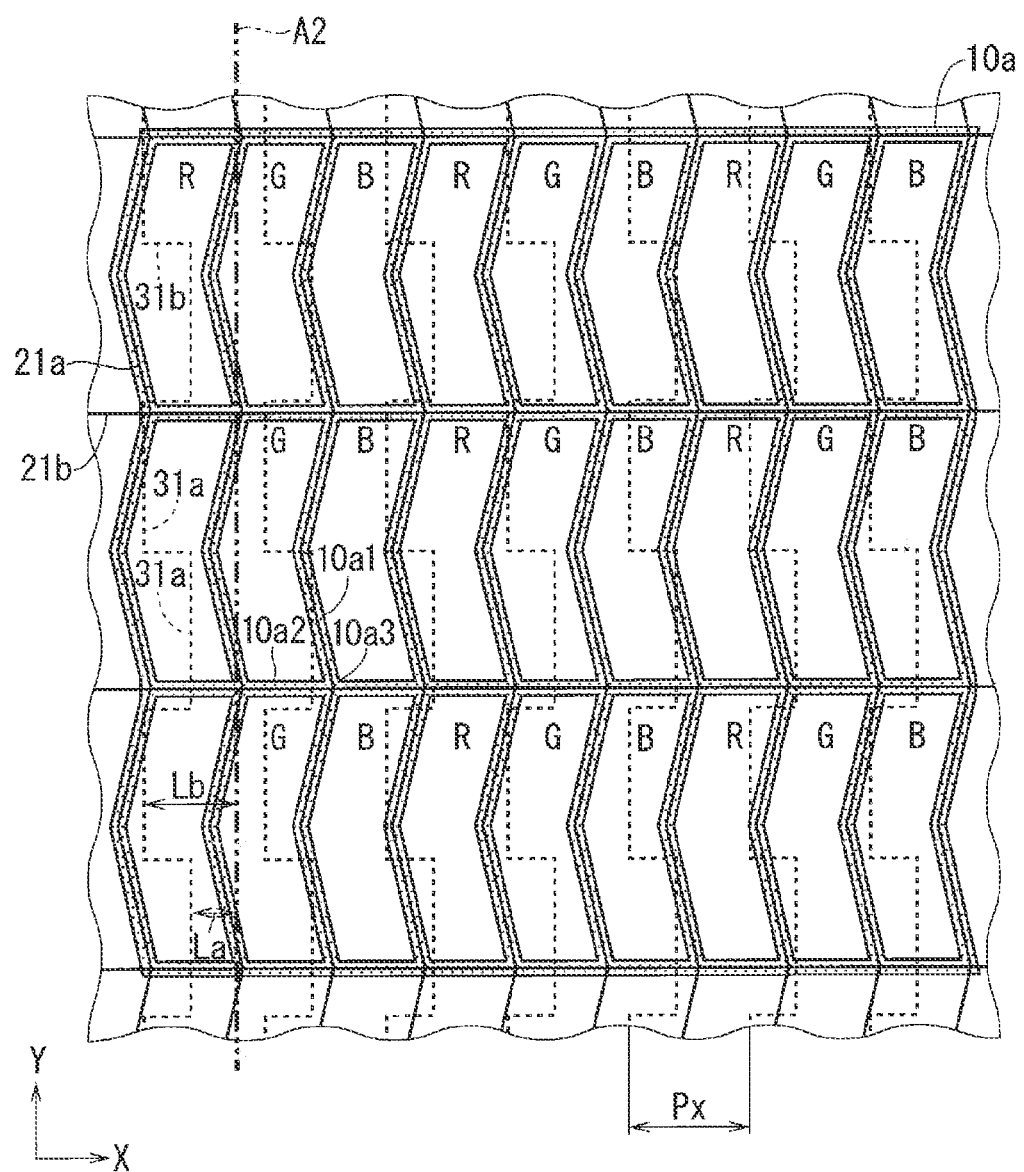
FIG. 32 is an enlarged plan view showing an example of a region A1 according to a modification.

For example, as shown in FIG. 32, the openings (corresponding to the sub-pixels) of the black matrix 10a may each have such a shape that the two long sides of the above-mentioned rectangle are replaced with sides of a V-shape. In other words, the first component portion 10a1 of the black matrix 10a may be formed of a component that combines a component extending in the column direction and a component extending in the row direction. The second component portion 10a2 of the black matrix 10a may be formed of a component that combines a component extending in the column direction and a component extending in the row direction, but it is not shown. In any of the cases, the distances between the first lattice passing line segment A2 and the column partial wire for column 31a are unequal. Therefore, the occurrence of moiré can be suppressed in the similar manner as described above.

Figure 33:
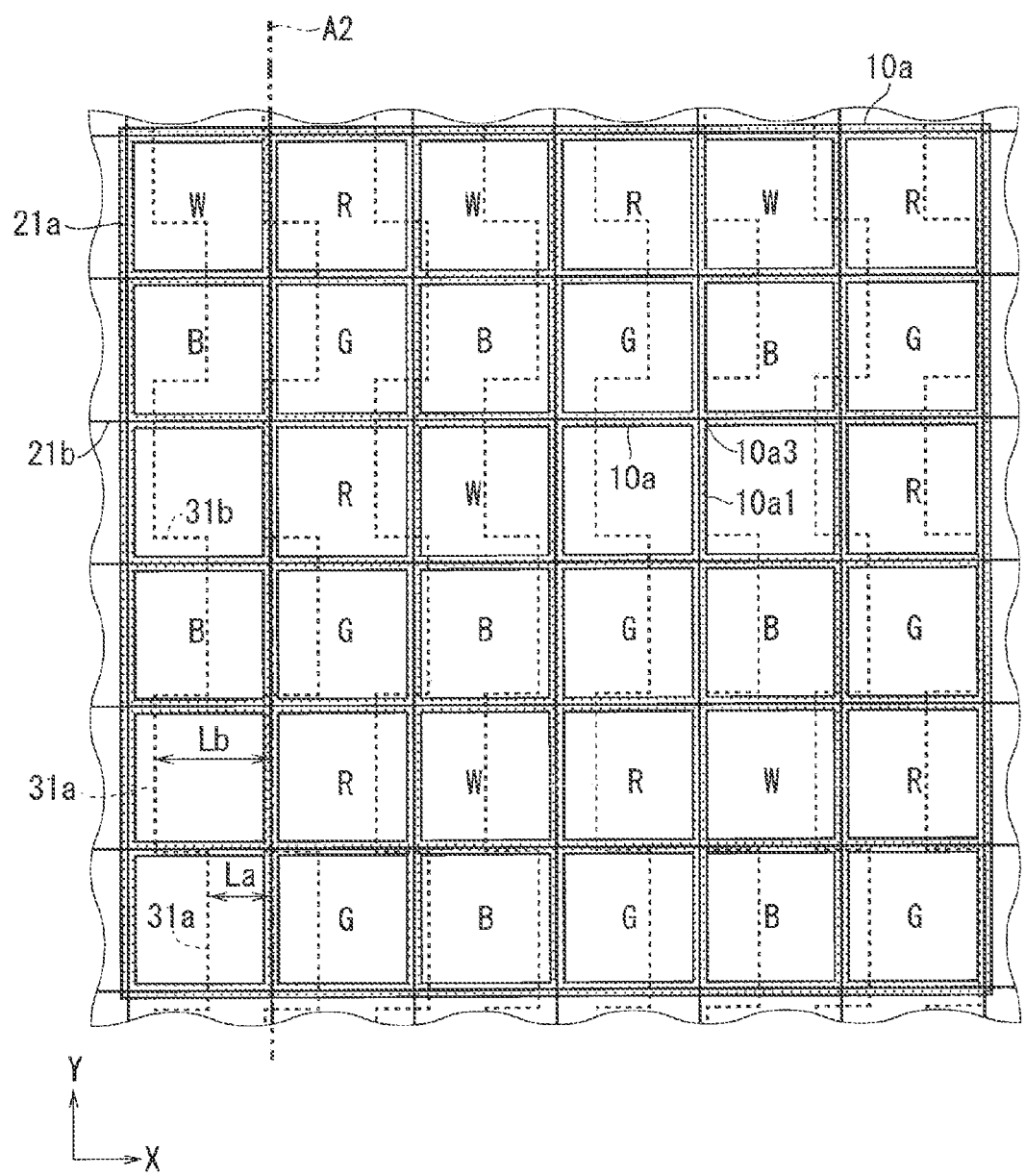
FIG. 33 is an enlarged plan view showing another example of the region A1 according to the modification.

For example, as shown in FIG. 33, the openings (corresponding to the sub-pixels) of the black matrix 10a may each have a square shape in which a pair of opposite sides extend in the column direction. Also in this case, the distances between the first lattice passing line segment A2 and the column partial wire for column 31 are unequal. Therefore, the occurrence of moiré can be suppressed in the similar manner as described above. W shown in FIG. 33 represents white sub-pixels.

As the fifth preferred embodiment, an excellent example is shown in which the column partial wires for row 21a, the row partial wires for row 21b, and the column partial wires for column 31a are each arranged at regular intervals, but they may not be arranged at regular intervals. In the fifth preferred embodiment, the column-direction wires 31 each have the zigzag wiring pattern shown in the first preferred embodiment, but may have the checkered wiring pattern shown in the second preferred embodiment.

For example, similarly to the third preferred embodiment, two or more column partial wires for column 31a may be arranged in the straight lines extending in the column direction, and two or more first lattice passing line segments A2 may be arranged in the staggered manner along the column direction.

Modifications of First to Fifth Preferred Embodiments

In the first preferred embodiment, two or more first lattice passing line segments A2 are arranged in the straight lines extending in the column direction, and two or more column partial wires for row 21a are arranged in the staggered manner along the column direction. In other words, two or more column partial wires for row 21a are alternately disposed in two straight lines extending in the column direction. However, the structure is not limited to this, and two or more column partial wires for row 21a may be equally arranged in three or more straight lines extending in the column direction. The same holds true for the second to fourth preferred embodiments.

In the descriptions above, the first direction is assumed to be the column direction, and the second direction is assumed to be the row direction. However, the directions are not limited to those, and the first direction may be the row direction, and the second direction may be the column direction. Also in the descriptions above, the polarization axis by the polarizing plate 13 is assumed to be parallel to the column direction, but it may be parallel to the row direction.

Sixth Preferred Embodiment

Figure 34:
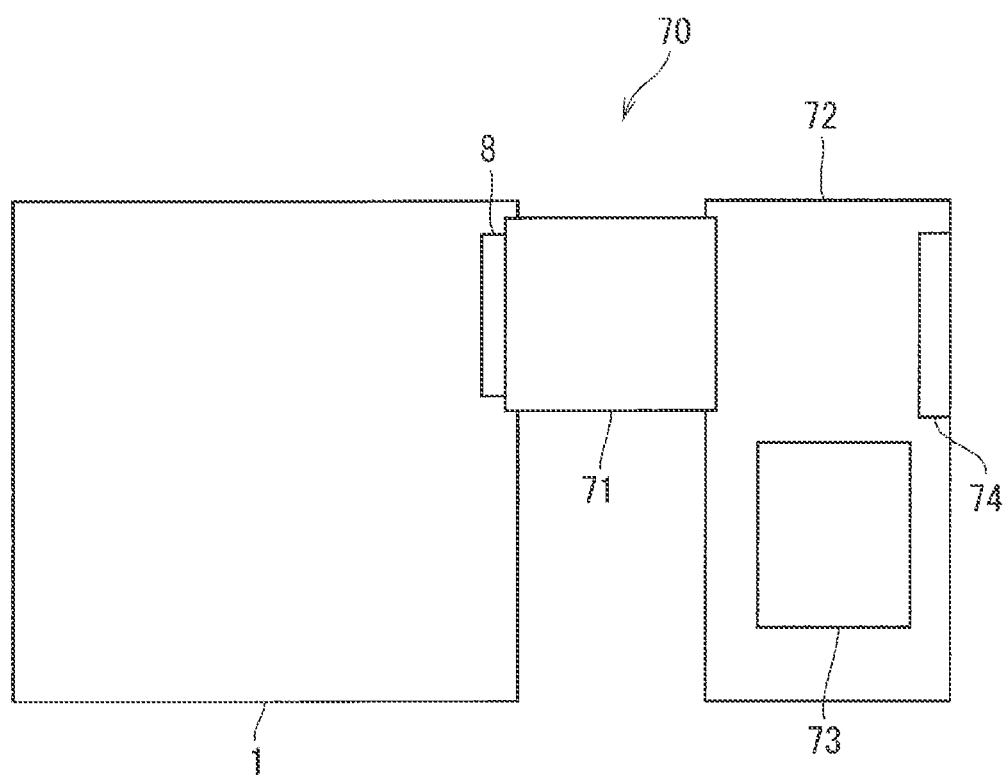
FIG. 34 is a plan view showing a configuration of a touch panel according to a sixth preferred embodiment.

FIG. 34 is a plan view schematically showing a configuration of a touch panel 70 according to a sixth preferred embodiment of the present invention. The touch panel 70 includes the touch screen 1 in the first preferred embodiment shown in FIG. 1, a flexible printed board 71, and a controller board 72.

A terminal compatible with the flexible printed board 71 is mounted on each terminal 8 of the touch screen 1 by using an anisotropic conductive film (ACF) or the like. For the sake of convenience, the position of the terminal 8 on the touch screen 1 in FIG. 34 is changed from the position of the terminal 8 in FIG. 2.

The end portions of the row-direction wires 21 and the column-direction wires 31 of the touch screen 1 are electrically connected to the controller board 72 through the flexible printed board 71. Thus, the touch screen 1 functions as a main structural component of the touch panel 70.

A detection processing circuit 73 for detecting a touch position is installed on the controller board 72. The detection processing circuit 73 detects touch capacitance composed of capacitance between an indicator and at least ones of the row-direction wires 21 (detection row wiring) and the column-direction wires 31 (detection column wiring) by application of signal voltage. The detection processing circuit 73 performs detection processing (calculation processing) of the position (touch position), which has been indicated by the indicator, on the touch screen 1 based on the detection result (touch capacitance). The detection processing circuit 73 can use a projected capacitive detection logic.

An external connection terminal 74 provided on the controller board 72 outputs the result of the calculation processing of the touch coordinates by the detection processing circuit 73 to an external processing device.

The touch panel 70 according to the sixth preferred embodiment having the above-mentioned configuration includes the touch screen 1 according to the first preferred embodiment described above. Consequently, the touch panel 70 in which moiré is hardly visually identified can be provided without lowering a contrast ratio when being integrated with the liquid crystal display.

In the descriptions above, the touch panel 70 includes the touch screen 1 according to the first preferred embodiment. The configuration, however, is not limited to this, and the touch panel 70 may include the touch screen 1 according to any of the second to fifth preferred embodiments instead. In a case where the touch panel 70 includes the touch screen according to the fifth preferred embodiment, the ACF for the lower electrode 20 is mounted on the TFT array substrate, and the ACF for the upper electrode 30 is mounted on the surface of the color filter substrate 10 on which the upper electrode 30 is disposed.

The detection processing circuit 73 on the controller board 72 may be directly disposed on the color filter substrate 10 instead of the controller board 72. These modifications may be similarly applied to a seventh preferred embodiment and an eighth preferred embodiment described below.

Seventh Preferred Embodiment

A display according to a seventh preferred embodiment of the present invention includes the touch panel 70 (FIG. 34) and the display element 51 (FIG. 1) and has a structure in which they are integrated with each other. The touch screen 1 of the touch panel 70 is disposed on the display element 51 on a user side farther forward than a display screen of the display element 51. In this manner, the touch-panel-equipped display having the function of detecting a touch position indicated by a user can be formed by mounting the touch panel 70 on the display screen of the display element 51 on the user side.

The display according to the seventh preferred embodiment having the above-mentioned configuration includes the touch panel 70 (touch screen 1) having excellent display quality. Therefore, the projected-capacitive-touch-panel-equipped display having excellent display quality can be achieved.

Eighth Preferred Embodiment

An electronic apparatus according to an eighth preferred embodiment of the present invention includes the display (having the structure in which the touch panel 70 shown in FIG. 34 and the display element 51 shown in FIG. 1 are integrated with each other) according to the seventh preferred embodiment described above and a signal processing element being an electronic element. The signal processing element processes an output from the external connection terminal 74 of the touch panel 70 as an input signal and outputs a digital signal obtained from the processing. By connecting the signal processing element to the touch panel 70, the electronic apparatus with the touch position detection function, such as a digitizer, that outputs the detected touch position to an external signal processing device, such as a computer, can be formed.

The signal processing element may be built in the controller board 72. When the signal processing element is formed so as to have an output function that meets standards of a bus such as a universal serial bus (USB), a versatile electronic apparatus with the touch position detection function can be achieved.

The electronic apparatus according to the eighth preferred embodiment having the above-mentioned configuration includes the touch panel 70 (touch screen 1) having excellent display quality. Therefore, the projected capacitive electronic apparatus with the touch position detection function that has excellent display quality can be achieved.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A touch screen, comprising:
    a color filter substrate on which a black matrix is disposed, said black matrix having a plurality of first component portions that include components extending in a first direction and a plurality of second component portions that include components extending in a second direction perpendicular to said first direction, said black matrix having a plurality of openings surrounded by said first component portions and said second component portions;
    first sensor wiring of metal that overlaps said color filter substrate in plan view and extends in said first direction or said second direction; and
    a polarizing plate that overlaps said color filter substrate in plan view and has a polarization axis in said first direction or said second direction, wherein
    said first sensor wiring only includes a plurality of first partial wires extending in said first direction and a plurality of second partial wires extending in said second direction,
    a plurality of first lattice passing line segments are defined, said first lattice passing line segments extending in said first direction through lattice points adjacent to each other among a plurality of lattice points at which said plurality of first component portions and said plurality of second component portions of said black matrix are connected to each other, and
    ones of two or more said first partial wires and two or more said first lattice passing line segments are arranged in straight lines extending in said first direction, and the other ones are arranged along said first direction and located at unequal distances from said ones.

2. The touch screen according to claim 1, wherein two or more said first partial wires are arranged at a predetermined interval in said second direction.

3. The touch screen according to claim 1, wherein said openings of said black matrix have a rectangular shape whose long sides extend in said first direction.

4. The touch screen according to claim 1, wherein said openings of said black matrix have a square shape in which a pair of opposite sides extend in said first direction.

5. The touch screen according to claim 1, wherein
    two or more said first lattice passing line segments are arranged in said straight lines, and
    two or more said first partial wires are arranged in a staggered manner along said first direction.

6. The touch screen according to claim 1, wherein
    two or more said first partial wires are arranged in said straight lines, and
    two or more said first lattice passing line segments are arranged in a staggered manner along said first direction.

7. The touch screen according to claim 1, further comprising second sensor wiring of metal that overlaps said color filter substrate in plan view and extends in one direction of said first direction and said second direction different from the other direction in which said first sensor wiring extends, wherein
    said second sensor wiring only includes a plurality of third partial wires extending in said first direction and a plurality of fourth partial wires extending in said second direction,
    a plurality of second lattice passing line segments are defined, said second lattice passing line segments extending in said second direction through lattice points adjacent to each other among said plurality of lattice points of said black matrix, and
    ones of two or more said fourth partial wires and two or more said second lattice passing line segments are arranged in straight lines extending in said second direction, and the other ones are arranged along said second direction and located at unequal distances from said ones.

8. The touch screen according to claim 7, wherein
    two or more said third partial wires are arranged in said second direction at a second interval n times as large as a predetermined first interval, n being an integer of two or more, and
    wires obtained by combining two or more said first partial wires and two or more said third partial wires in plan view are arranged at said first interval in said second direction.

9. The touch screen according to claim 7, wherein at least ones of two or more said second partial wires and two or more said fourth partial wires are arranged at a predetermined interval in said first direction.

10. The touch screen according to claim 1, further comprising second sensor wiring of metal that overlaps said color filter substrate in plan view and extends in one direction of said first direction and said second direction different from the other direction in which said first sensor wiring extends, wherein of said first sensor wiring and said second sensor wiring, one wiring extending in said first direction is disposed between said color filter substrate and said polarizing plate while the other wiring extending in said second direction is disposed opposite to said one wiring with respect to said color filter substrate, and said other wiring is covered with said black matrix in plan view.

11. A touch panel, comprising:

the touch screen according to claim 1; and a detection processing circuit detecting a position indicated by an indicator on said touch screen based on capacitance between said indicator and at least said first sensor wiring.

12. A display, comprising:

the touch panel according to claim 11; and a display element disposed on said touch screen of said touch panel.

13. An electronic apparatus, comprising:

the display according to claim 12; and an electronic element processing an output of said detection processing circuit of said touch panel as an input signal.

* * * * *